(12) United States Patent
Fukuda et al.

(10) Patent No.: US 9,046,703 B2
(45) Date of Patent: Jun. 2, 2015

(54) OPTICAL MODULATOR MODULE AND SEMICONDUCTOR OPTICAL MODULATOR

(71) Applicant: SUMITOMO ELECTRIC INDUSTRIES, LTD., Osaka-shi, Osaka (JP)

(72) Inventors: Chie Fukuda, Kamakura (JP); Naoya Kono, Yokohama (JP); Morihiro Seki, Shinagawa-ku (JP); Kazuhiro Yamaji, Yokohama (JP); Yasuyuki Yamauchi, Kofu (JP); Keiji Tanaka, Chigasaki (JP); Taizo Tatsumi, Kamakura (JP); Naoki Itabashi, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/191,025

(22) Filed: Feb. 26, 2014

(65) Prior Publication Data

US 2014/0241659 A1 Aug. 28, 2014

(30) Foreign Application Priority Data

Feb. 27, 2013 (JP) ................ 2013-037314

(51) Int. Cl.
| | |
|---|---|
| *G02F 1/035* | (2006.01) |
| *G02F 1/01* | (2006.01) |
| *G02F 1/225* | (2006.01) |
| *H04B 10/556* | (2013.01) |
| *G02B 6/293* | (2006.01) |

(52) U.S. Cl.
CPC ............ *G02F 1/0121* (2013.01); *G02F 1/2257* (2013.01); *H04B 10/556* (2013.01); *G02B 6/29355* (2013.01)

(58) Field of Classification Search
USPC ............................................. 385/3
See application file for complete search history.

(56) References Cited

FOREIGN PATENT DOCUMENTS

| | | |
|---|---|---|
| JP | 2006-065085 | 3/2006 |
| JP | 4235154 | 12/2008 |
| JP | 2010-008869 | 1/2010 |

OTHER PUBLICATIONS

Velthaus et al, : "High performance InP-based Mach-Zehnder modulators for 10 to 100 GB/s optical fiber transmission systems", $23^{rd}$ International Conference on Indium Phosphide and Related Materials, IPRM 2011, Th-8.1.2 May 22-26, 2011, Berlin Germany.
Machine translation for Publication No. JP2006-65085 corresponding to Japanese Patent No. 4235154.

*Primary Examiner* — Ryan Lepisto
*Assistant Examiner* — Erin Chiem
(74) *Attorney, Agent, or Firm* — Smith, Gambrell & Russell LLP

(57) ABSTRACT

A semiconductor optical modulator includes optical input and output portions; a plurality of Mach-Zehnder modulators, each including first and second waveguide arms having first and second modulation electrodes, respectively; an optical demultiplexer coupled between the optical input portion and the Mach-Zehnder modulators through an optical waveguide; an optical multiplexer coupled between the optical output portion and the Mach-Zehnder modulators; a plurality of electrical inputs; and a plurality of differential transmission lines electrically connecting the electrical inputs to the Mach-Zehnder modulators. The first modulation electrode and the second modulation electrode of at least one of the Mach-Zehnder modulators, one of the electrical inputs, and one of the differential transmission lines that connects such one electrical input to such one Mach-Zehnder modulator form an electrical circuit having a differential impedance in a range of $80\Omega$ to $95\Omega$.

13 Claims, 14 Drawing Sheets

OPTICAL MODULATOR MODULE AND SEMICONDUCTOR OPTICAL MODULATOR

BACKGROUND OF THE INVENTION

1. Field of the Invention

The present invention relates to an optical modulator module and a semiconductor optical modulator.

2. Description of the Related Art

Japanese Patent No. 4235154 and Japanese Unexamined Patent Application Publication No. 2010-008869 disclose InP-based modulators. K.-O. Velthaus, et. al, "High performance InP-based Mach-Zehnder modulators for 10 to 100 Gb/s optical fiber transmission systems," 23rd International Conference on Indium Phosphide and Related Materials, IPRM 2011, Th-8.1.2 May 22-26, 2011, Berlin, Germany discloses another InP-based modulator.

The above-cited paper discloses an integrated optical device in which four Mach-Zehnder (MZ) modulators are integrated. A modulation signal for the push-pull modulation is applied to the individual waveguide arms through a single-phase transmission line having a characteristic impedance of 50 Ohm ($\Omega$). The modulator is thus modulated by the modulation signal passing through the transmission line.

The modulator disclosed in Japanese Patent No. 4235154 is also modulated by applying a modulation signal to waveguide arms through a single-phase transmission line. Furthermore, in Japanese Unexamined Patent Application Publication No. 2010-008869, the MZ modulator is modulated by the modulation signal passing through a transmission line. Japanese Unexamined Patent Application Publication No. 2010-008869 discloses that the transmission line connected to the MZ modulator has a characteristic impedance of 50$\Omega$.

SUMMARY OF THE INVENTION

An integrated optical modulator for optical phase modulation includes a plurality of MZ modulators. A modulated electrical signal applying to the MZ modulators contains a high-frequency component. Therefore, a transmission line in which the modulated electrical signal propagates is constituted to have a predetermined characteristic impedance. In the MZ modulator disclosed in the above-cited paper, the modulator is modulated by the modulated electrical signal passing through the transmission line having the characteristic impedance of 50$\Omega$. The MZ modulator disclosed in Japanese Unexamined Patent Application Publication No. 2010-008869 is also modulated by the modulated electrical signal passing through the transmission line having the characteristic impedance of 50$\Omega$. A high-frequency transmission line having the characteristic impedance of 50$\Omega$ is generally used to transmit the modulated electrical signal to the MZ modulators. The characteristic impedance of the transmission line is related to power consumption of the modulator. In other words, power consumption of the modulator changes depending on the characteristic impedance of the transmission line.

The integrated optical modulator includes a plurality of MZ modulators. Therefore, power consumption of the integrated optical modulator increases depending on the number of modulators. Therefore, it is not easy to avoid an increase in the power consumption of the integrated optical modulator.

A semiconductor optical modulator according to an aspect of the present invention includes (a) an optical input portion; (b) an optical output portion; (c) a plurality of Mach-Zehnder modulators arrayed in a direction of a first axis, each of the Mach-Zehnder modulators including a first waveguide arm with a first modulation electrode and a second waveguide arm with a second modulation electrode; (d) an optical waveguide having a mesa structure; (e) an optical demultiplexer coupled between the optical input portion and the Mach-Zehnder modulator through the optical waveguide; (f) an optical multiplexer coupled between the optical output portion and the Mach-Zehnder modulator; (g) a plurality of electrical inputs, each of which includes a first electrode, a second electrode, and a common electrode disposed between the first electrode and the second electrode, and (h) a plurality of differential transmission lines electrically connecting the electrical inputs to the Mach-Zehnder modulators. The Mach-Zehnder modulators, the optical demultiplexer, the optical multiplexer, the electrical inputs, and the differential transmission lines are disposed on a single substrate. In addition, the first modulation electrodes, the second modulation electrodes, the electrical inputs, and the differential transmission lines have a differential impedance in a range of 80$\Omega$ to 95$\Omega$.

In the semiconductor optical modulator described above, the impedance of the first and second waveguide arms is increased in comparison with that in a conventional optical modulator, and the semiconductor optical modulator having the differential impedance in the range of 80$\Omega$ to 95$\Omega$ is provided. Therefore, power consumption of a drive circuit for supplying electrical signals to the electrical inputs of the semiconductor optical modulator is reduced.

By employing a voltage amplitude E of the drive signal for the first MZ modulator and an impedance Z0 of the waveguide arms of the first MZ modulator, electric power consumed to drive the semiconductor optical modulator is expressed by $E^2/Z0$. Here, the voltage amplitude E is usually set to a voltage amplitude V$\pi$ that is required to change the phase of light propagating through the modulation optical waveguide by $\pi$ (½ wavelength). In the following description, the voltage amplitude E of the drive signal for the first MZ modulator is denoted by the voltage amplitude V$\pi$ unless otherwise specified.

The semiconductor optical modulator according to the present invention may further include a resin body disposed on the substrate, the resin body embedding the first and second waveguide arms of the Mach-Zehnder modulator, the optical demultiplexer, and the mesa structure of the optical waveguide therein. Each of the Mach-Zehnder modulators further includes a modulator common electrode. The first waveguide arm includes a first semiconductor layer having a first conductivity type, a third semiconductor layer having a second conductivity type, and a first core layer disposed between the first semiconductor layer and the third semiconductor layer. The second waveguide arm includes a second semiconductor layer having a first conductivity type, a fourth semiconductor layer having a second conductivity type, and a second core layer disposed between the semiconductor second layer and the fourth semiconductor layer. The first modulation electrode is disposed on the first semiconductor layer. The second modulation electrode is disposed on the second semiconductor layer. The modulator common electrode is contacted with the third semiconductor layer and the fourth semiconductor layer. The differential transmission lines include a first conductor connecting the first electrode to the first modulation electrode, a second conductor connecting the second electrode to the second modulation electrode, and a third conductor connecting the common electrode to the modulator common electrode. The third conductor is positioned between the first conductor and the second conductor. In addition, the first conductor, the second conductor, and the third conductor extend on the resin body in parallel.

In the semiconductor optical modulator described above, the semiconductor modulators and the optical demultiplexer are buried in the resin body having a low dielectric constant. The first conductor and the second conductor are connected respectively to the first waveguide arm and the second waveguide arm. The third conductor is positioned between the first conductor and the second conductor, and it extends in parallel to the first and second conductors. Since the differential transmission lines to drive the MZ modulator are constituted by the first conductor, the second conductor, and the third conductor, the number of wiring lines required to drive one MZ modulator is three.

In the semiconductor optical modulator according to the present invention, the resin body may contain a benzocyclobutene resin.

In the semiconductor optical modulator according to the present invention, preferably, the first conductor, the second conductor, and the third conductor extend over the mesa structure of the optical waveguide through the resin body. The resin body is disposed between the first conductor, the second conductor, and the third conductor and the mesa structure of the optical waveguide.

In the semiconductor optical modulator described above, the first conductor, the second conductor, and the third conductor of the differential transmission lines are arranged such that the third conductor is positioned between the first conductor and the second conductor, and that the third conductor extends on the resin body in parallel to the first and second conductors. Thus, the differential transmission lines have a structure in which the common third conductor is positioned between the first conductor and the second conductor. In the differential transmission lines, conductors connected to a common electrode are not disposed on both sides of each of the first and second conductors. Therefore, an increase of a total area of the conductors on the resin body is avoided, and an increase of stress in the resin body due to the difference in thermal expansion coefficients between the resin body and the conductors can be reduced.

In the semiconductor optical modulator according to the present invention, the modulator common electrode may have a width greater than at least one of widths of the first modulation electrode and the second modulation electrode. In the differential transmission lines, the third conductor may have a width smaller than respective widths of the first conductor and the second conductor.

The semiconductor optical modulator according to the present invention may further include a connecting semiconductor layer having the second conductivity type, the connecting semiconductor layer connecting the third semiconductor layer of the first waveguide arm and the fourth semiconductor layer of the second waveguide arm to each other. The resin body preferably has a first opening on the first waveguide arm, a second opening on the second waveguide arm, and a third opening on the connecting semiconductor layer. The first modulation electrode is connected to the first semiconductor layer through the first opening. The second modulation electrode is connected to the second semiconductor layer through the second opening. The modulator common electrode is connected to the connecting semiconductor layer through the third opening disposed between the first waveguide arm and the second waveguide arm.

In the semiconductor optical modulator described above, the differential transmission lines containing a less number of wiring conductors are employed. Thus, the electrical signal from the first waveguide arm is propagated to the third conductor from the third semiconductor layer through the connecting semiconductor layer. The electrical signal from the second waveguide arm is propagated to the third conductor from the fourth semiconductor layer through the connecting semiconductor layer. The electrical signals having opposite phases based on differential signals, which are applied to the first and second waveguide arms, are propagated through the connecting semiconductor layer.

In the semiconductor optical modulator according to the present invention, the substrate preferably has a first edge and a second edge each extending in the direction of the first axis, and a third edge and a fourth edge each extending in a direction of a second axis that intersects the first axis. The first electrode, the second electrode, and the common electrode are arrayed along the first edge. The optical output portion is positioned at the second edge opposite to the first edge. In addition, the optical input portion is positioned at the third edge or the fourth edge.

In the semiconductor optical modulator described above, the first electrode, the second electrode, and the common electrode are positioned at the first edge. Furthermore, the optical outputs are positioned at the second edge, and the second edge is positioned on the opposite side to the first edge. Therefore, the position of the optical input and the positions of the electrical inputs are avoided from interfering with each other. In addition, wiring lines connecting the electrical inputs to the semiconductor modulator are avoided from being bent to a large extent.

An optical modulator module according to another aspect of the present invention includes (a) the semiconductor optical modulator described above or disclosed in any of the following embodiments; (b) a drive circuit including a differential input having a first impedance and a differential output having a second impedance that is different from the first impedance; and (c) a relay board including wiring lines that connect the differential output of the drive circuit to the electrical input of the semiconductor optical modulator.

In the optical modulator module described above, the semiconductor optical modulator is driven by the drive circuit that includes the differential inputs having the first impedance and the differential outputs having the second impedance that is different from the first impedance. The semiconductor optical modulator includes the first and second waveguide arms having a high differential impedance in the range of 80Ω to 95Ω. Therefore, power consumption of the drive circuit for supplying the electrical signals to the electrical inputs of the semiconductor optical modulator is reduced.

In the optical modulator module according to the present invention, preferably, the second impedance of the drive circuit is 80Ω or more and 95Ω or less. A differential impedance of the wiring lines on the relay board is 80Ω or more and 95Ω or less.

In the optical modulator module described above, since the differential impedance of the wiring lines on the relay board is in the range of 80Ω or more and 95Ω or less, narrowing of a transmission hand is avoided in transmission of differential signals from the drive circuit to the semiconductor optical modulator. In addition, impedance matching is achieved in the differential outputs of the drive circuits, the wiring lines on the relay board and the first and second waveguide arms of the semiconductor optical modulators.

In the optical modulator module according to the present invention, preferably, the substrate has a first edge and a second edge each extending in the direction of the first axis, and a third edge and a fourth edge each extending in a direction of a second axis that intersects the first axis. The electrical input is positioned at the first edge. The optical input portion is positioned at the third edge or the fourth edge. In addition, the optical output portion is positioned at the second edge opposite to the first edge.

In the optical modulator module described above, the substrate, the semiconductor optical modulator, and the polarization multiplexing device are arrayed along the second axis. Therefore, the positions of the optical outputs and the positions of the electrical inputs are avoided from interfering with each other.

In the optical modulator module according to the present invention, preferably, the first electrode, the second electrode, and the common electrode of the electrical input are arrayed along the first edge of the substrate. The differential input of the drive circuit includes a first ground electrode, a first input electrode, a second input electrode, and a second ground electrode. The differential outputs of the drive circuit include a first output electrode, a third ground electrode, and a second output electrode that are arrayed in one direction in mentioned order. The semiconductor optical modulator further includes a resin body disposed on the substrate, the resin body embedding the first and second waveguide arms of the Mach-Zehnder modulator, the optical demultiplexer, and the mesa structure of the optical waveguide therein. Each of the Mach-Zehnder modulators further includes a modulator common electrode. The first waveguide arm includes a first semiconductor layer having a first conductivity type, a third semiconductor layer having a second conductivity type, and a first core layer disposed between the first semiconductor layer and the third semiconductor layer. The second waveguide arm includes a second semiconductor layer having a first conductivity type, a fourth semiconductor layer having a second conductivity type, and a second core layer disposed between the semiconductor second layer and the fourth semiconductor layer. The first modulation electrode is disposed on the first semiconductor layer. The second modulation electrode is disposed on the second semiconductor layer. The modulator common electrode is contacted with the third semiconductor layer and the fourth semiconductor layer. The differential transmission lines include a first conductor connecting the first electrode to the first modulation electrode, a second conductor connecting the second electrode to the second modulation electrode, and a third conductor connecting the common electrode to the modulator common electrode. The third conductor is positioned between the first conductor and the second conductor. In addition, the first conductor, the second conductor, and the third conductor extend on the resin body in parallel.

In the optical modulator module described above, the drive circuit has the differential inputs including the first ground electrode, the first input electrode, the second input electrode, and the second ground electrode. The drive circuit further has the differential outputs including the first output electrode, the third ground electrode, and the second output electrode. The drive circuit performs not only impedance conversion, but also conversion of wiring order. The differential transmission lines in the wiring order after being converted by the drive circuit are constituted on the relay board. The differential signals from the relay board are applied to the semiconductor optical modulator, and the differential signals propagate through the differential transmission lines. The differential transmission lines are constituted by the first conductor, the third conductor, and the second conductor which extend in parallel on the resin body having the low dielectric constant. Those differential signals transmitted through the differential transmission lines drive one MZ modulator.

In the optical modulator module according to the present invention may further include a polarization multiplexing device that is optically coupled to the optical output portion of the semiconductor optical modulator. The drive circuit, the relay board, the semiconductor optical modulator, and the polarization multiplexing device are preferably arrayed along a direction of a second axis that intersects the first axis.

In the optical modulator module described above, optical signals from the optical output ports positioned at the second edge of the semiconductor optical modulator are optically coupled to the polarization multiplexing device while wiring lines connecting the electrical inputs to the semiconductor modulator are avoided from being bent to a large extent. In the relay board, the differential transmission lines are also avoided from being bent to a larger extent.

DESCRIPTION OF THE PREFERRED EMBODIMENTS

An optical modulator module and a semiconductor optical modulator according to an embodiment of the present invention will be described below with reference to the accompanying drawings. Where possible, the same portions are denoted by the same reference signs.

Figure 1:
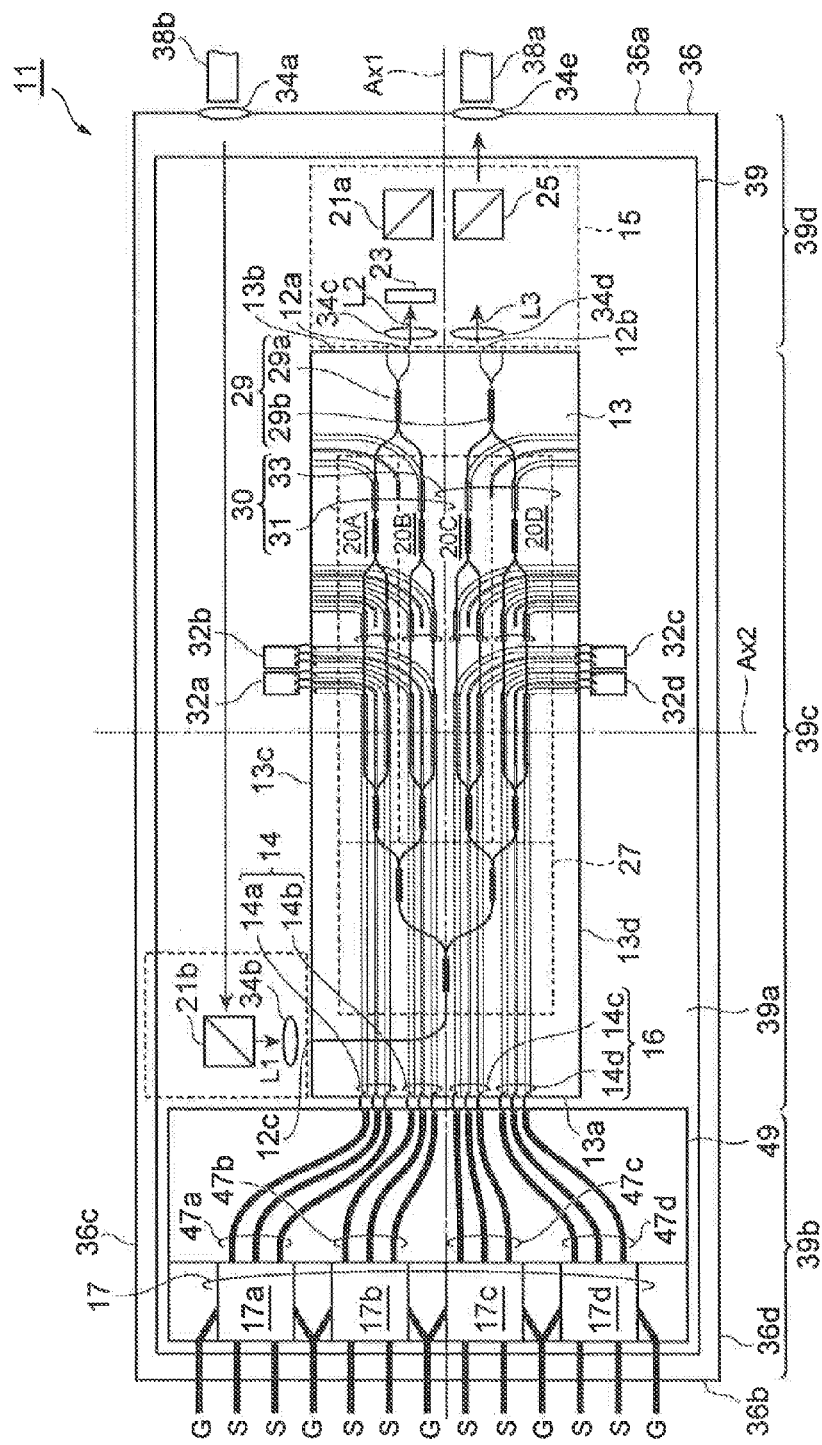
FIG. 1 is a schematic view of an optical modulator module according to an embodiment.

FIG. 1 is a schematic view of an optical modulator module according to the embodiment. An optical modulator module 11 includes a semiconductor optical modulator 13, a polarization multiplexing device 15, and a drive circuit 17. The drive circuit 17, the semiconductor optical modulator 13, and the polarization multiplying device 15 are arrayed in the direction of a first axis Ax1 in the mentioned order. The drive circuit 17 includes differential inputs having a first impedance and differential output having a second impedance. The first impedance is different from the second impedance. The optical modulator module 11 further includes a wiring board 49 provided with wiring lines 47a, 47b, 47c and 47d for connecting outputs of the drive circuit 17 to electrical inputs 14 and 16 (each including a first electrode, a second electrode, and a common electrode) of the semiconductor optical modulator 13. According to the optical modulator module 11, the semiconductor optical modulator 13 is driven by the drive circuit 17 that includes the differential inputs having the first impedance and the differential outputs having the second impedance. The semiconductor optical modulator 13 includes first and second waveguide arms having a higher impedance than that in the related-art semiconductor optical modulator. A differential impedance in the waveguide arms of the semiconductor optical modulator 13 is preferably 80Ω or more. Thus, power consumption of the drive circuit for supplying electrical signals to the electrical inputs of the semiconductor optical modulator can be reduced.

The semiconductor optical modulator 13 has a first edge 13a and a second edge 13b. The first edge 13a and the second edge 13b intersect the first axis Ax1, and each of the first edge 13a and the second edge 13b extends in the direction of a second axis Ax1 intersecting the first axis Ax1. The drive circuit 17, the first edge 13a of the semiconductor optical modulator 13, the second edge 13b of the semiconductor optical modulator 13, and the polarization multiplexing device 15 are arrayed in the direction of the first axis Ax1 in the mentioned order.

A first optical output port 12a and a second optical output port 12b of the semiconductor optical modulator 13 are positioned at the second edge 13b of the semiconductor optical modulator 13. The semiconductor optical modulator 13 includes an optical demultiplexer (optical demultiplexing waveguide) 27, an optical multiplexer (optical multiplexing waveguide) 29, and a semiconductor modulator 30. The semiconductor modulator 30 includes a first group of optical modulators 31 and a second group of optical modulators 33. Stated in another way, the semiconductor modulator 30 includes a plurality of optical modulators that are arrayed on a semi-insulating InP substrate in the direction of the second axis Ax2. Each of those optical modulators may include a Mach-Zehnder (MZ) modulator. The optical demultiplexer 27, a first optical multiplexer 29a, a second optical multiplexer 29b, the first group of optical modulators 31, and the second group of optical modulators 33 constitute individual optical elements. The optical demultiplexer 27 is coupled between the optical input port 12c and the semiconductor modulator 30 of the semiconductor optical modulator 13, and it is disposed on the InP substrate. The optical multiplexer 29 includes the first optical multiplexer 29a and the second optical multiplexer 29b. The optical multiplexer 29 is coupled between the optical output ports 12a and 12b and the semiconductor modulator 30 of the semiconductor optical modulator 13, and it is disposed on the InP substrate. The first group of optical modulators 31 is optically coupled to the first optical output port 12a through the first optical multiplexer 29a.

The second group of optical modulators 33 is optically coupled to the second optical output port 12b through the second optical multiplexer 29b. The first group of optical modulators 31 and the second group of optical modulators 33 are optically coupled to the optical input port 12c through the optical demultiplexer 27. The optical elements of the semiconductor optical modulator 13 are disposed on a semi-insulating InP substrate, for example.

The first group of optical modulators 31 includes a first optical modulator 20A and a second optical modulator 20B. The second group of optical modulators 33 includes a third optical modulator 20C and a fourth optical modulator 20D. The first optical modulator 20A, the second optical modulator 20B, the third optical modulator 20C, and the fourth optical modulator 20D are optically coupled to the optical input port 12c through the optical demultiplexer 27.

The electrical inputs 14 and 16 are described below. A first electrical input 14a, a second electrical input 14b, a third electrical input 14c, and a fourth electrical input 14d are arrayed along the first edge 13a of the semiconductor optical modulator 13. The semiconductor optical modulator 13 includes a first group of electrical inputs 14 and a second group of electrical inputs 16. The first group of electrical inputs 14 is constituted by the first electrical input 14a and the second electrical input 14b. The second group of electrical inputs 16 is constituted by the third electrical input 14c and the fourth electrical input 14d. The drive circuit 17 is electrically connected to the first electrical input 14a, the second electrical input 14b, the third electrical input 14c, and the fourth electrical input 14d of the semiconductor optical modulator 13. The electrical inputs 14a to 14d are disposed on the InP substrate. Each of the electrical inputs 14a to 14d includes a first electrode, a second electrode, and a common electrode. The first and second electrodes receive differential drive signals from the outside. The common electrode is used for grounding. The electrical inputs 14a to 14d are connected respectively to the first optical modulator 20A, the second optical modulator 20B, the third optical modulator 20C, and the fourth optical modulator 20D through differential transmission lines. The differential transmission lines include a plurality of conductive lines that connect the first electrode, the second electrode, and the common electrode of the electrical input 14a to the first optical modulator 20A (specifically, a first waveguide arm and a second waveguide arm of a first MZ modulator) of the semiconductor modulator 30. A differential impedance of an electrical circuit including the first waveguide arm and the second waveguide arm of the first MZ modulator, the electrical input, and the differential transmission lines is in the range of 80Ω or more and 95Ω or less, for example. As in the first optical modulator 20A, the second optical modulator 20B, the third optical modulator 20C, and the fourth optical modulator 20D are also connected to respective first electrodes, second electrodes, and common electrodes of the electrical inputs 14a to 14d. A differential impedance of each of electrical circuits corresponding to the second optical modulator 20B, the third optical modulator 20C, and the fourth optical modulator 20D is also in the range of 80Ω or more and 95Ω or less, for example.

In the embodiment, the semiconductor optical modulator has the differential impedance in the range of 80Ω to 95Ω. Thus, an impedance of the first and second waveguide arms is set higher than that in the related-art optical modulator. Accordingly, the power consumption of the drive circuit 17 for supplying the electrical signals to the electrical inputs of the semiconductor optical modulator 13 can be reduced. Assuming, for example, that a voltage amplitude E of the drive signal for the first MZ modulator is Vπ and an impedance of the above-mentioned electrical circuit (e.g., the waveguide arms of the first MZ modulator) is Z0, electric power consumed to drive the semiconductor optical modulator is expressed by $E^2/Z0$. Here, the amplitude $V\pi$ of the electrical signal implies a voltage amplitude required to change the phase of light propagating through the modulation optical waveguide by it radians (that is equal to ½ wavelength in terms of the optical path length).

The semiconductor optical modulator 13 includes a first group of wiring lines that connect the first group of electrical inputs 14 to the first group of optical modulators 31, respectively, and a second group of wiring lines that connect the second group of electrical inputs 16 to the second group of optical modulators 33, respectively.

The semiconductor optical modulator 13 receives input light L1 at the optical input port 12c. The first group of optical modulators 31 receives a group of drive signals through a first group of wiring conductors. The second group of optical modulators 33 receives a group of drive signals through a second group of wiring conductors. Furthermore, one modulated light from the first group of optical modulators 31 is output from the first optical output port 12a as output light L2. Another modulated light from the second group of optical modulators 33 is output from the second optical output port 12b as output light L3.

In the semiconductor optical modulator 13, the first edge 13a is positioned on the opposite side to the second edge 13b. The first optical output port 12a and the second optical output port 12b are positioned at the second edge 13b of the semiconductor optical modulator 13. On the other hand, the first electrical input 14a, the second electrical input 14b, the third electrical input 14c, and the fourth electrical input 14d are arrayed along the first edge 13a of the semiconductor optical modulator 13. Thus, the first edge 13a along which the electrical signal inputs (14a, 14b, 14c and 14d) are arrayed is positioned on the opposite side to the second edge 13b at which the optical signal output ports are arranged. Thus, the semiconductor optical modulator 13 receives the electrical signals at the first edge 13a of the semiconductor optical modulator 13. The semiconductor optical modulator 13 converts the electrical signals to optical signals through the optical modulators (20A, 20B, 20C and 20D), and outputs the optical signals from the second edge 13b of the semiconductor optical modulator 13. The electrical signals and the optical signals propagate in the direction of the first axis Ax1. Therefore, input wiring lines for guiding the electrical signals and the optical waveguides for guiding the optical signals are also arrayed along the first axis Ax1.

The polarization multiplexing device 15 includes a first mirror 21a, a polarization rotator 23, and a polarization multiplexer 25. The semiconductor optical modulator 13 has the first optical output port 12a, the second optical output port 12b, and the optical input port 12c. The polarization rotator 23 receives the light L2 output from the first optical output port 12a of the semiconductor optical modulator 13. The first mirror 21a receives the light passing through the polarization rotator 23. The polarization multiplexer 25 is optically coupled to the first optical output port 12a of the semiconductor optical modulator 13 through the first mirror 21a, and is directly optically coupled to the second optical output port 12b of the semiconductor optical modulator 13.

In the optical modulator module 11, the semiconductor optical modulator 13 has a third edge 13c and a fourth edge 13d. Each of the third edge 13c and the fourth edge 13d extends in the direction of the axis perpendicular to the second axis Ax2. The optical input port 12c is positioned at the third edge 13c. The first to fourth optical modulators 20A to 20D are arrayed in the direction of the second axis Ax2. According to the optical modulator module 11, the optical input port 12c is positioned at the third edge 13c intersecting the second axis Ax2. On the other hand, the first to fourth electrical inputs 14a to 14d are arrayed along the first edge 13a. In the arrangement described above, the optical input port 12c is positioned at the edge 13c which is different from the first edge 13a along which the electrical signal inputs are arrayed. The optical input port 12c may be positioned at the edge 13d.

Next, the above arrangement is explained in more detail. The respective first electrodes, second electrodes, and common electrodes of the electrical inputs 14a to 14d are arrayed along the first edge 13a. On the other hand, the optical output ports 12a and 12b are positioned at the second edge 13b. The optical output ports 12a and 12b are optically coupled to the semiconductor modulator 30 through the optical multiplexer 29. In the embodiment, the first electrode, the second electrode, and the common electrode are positioned at the first edge 13a. The optical output ports 12a and 12b are positioned at the second edge 13b. The second edge 13b is positioned on the opposite side to the first edge 13a. Therefore, the wiring lines for connecting the electrical inputs 14a to 14d to the semiconductor modulator 30 can be avoided from being bent to a large extent.

Figure 2:
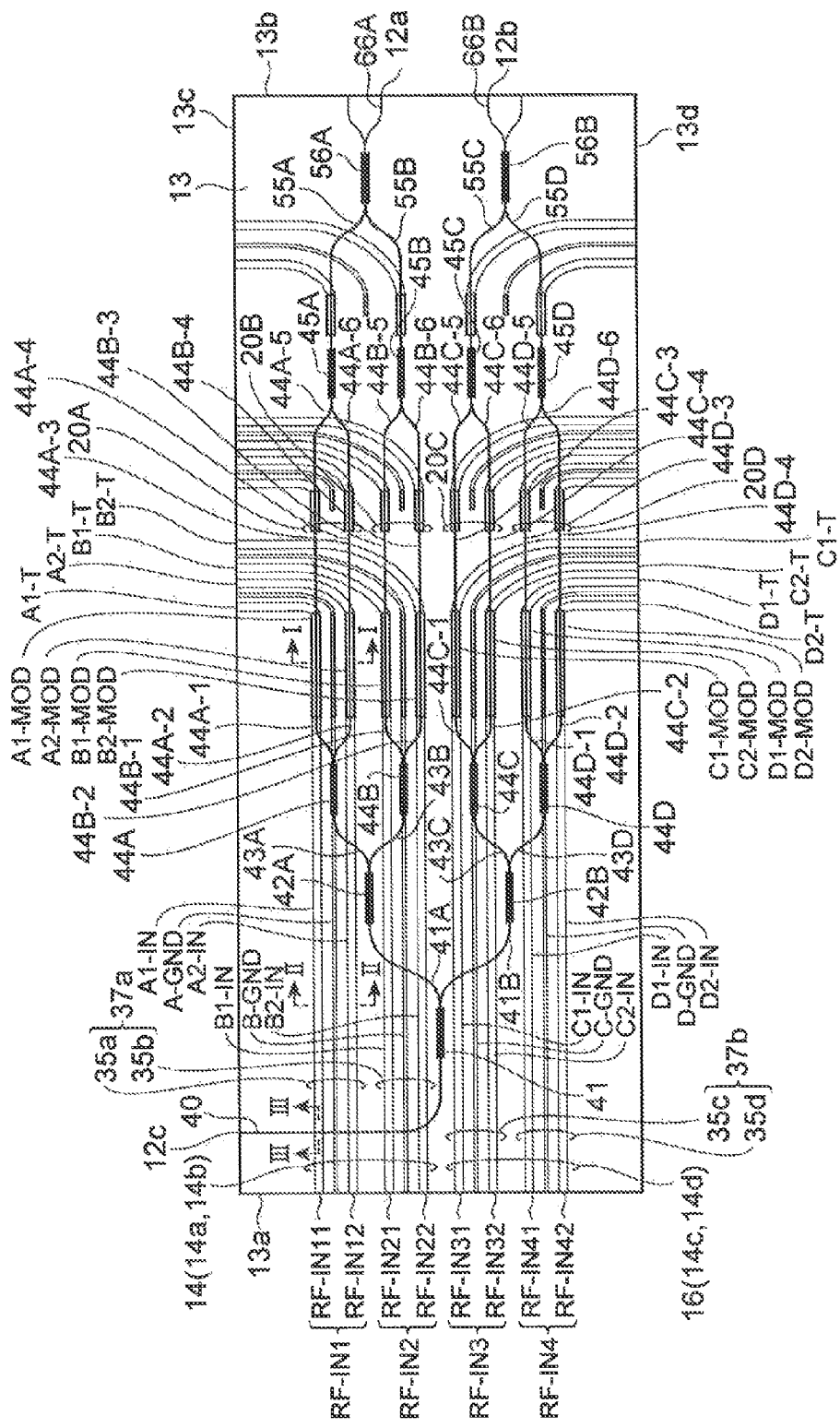
FIG. 2 illustrates an arrangement of optical waveguides in a semiconductor optical modulator.

FIG. 2 illustrates an arrangement of the optical waveguides in the semiconductor optical modulator 13. The arrangement of the optical waveguides in the semiconductor optical modulator 13 will be described below with reference to FIG. 2.

On a semi-insulating InP substrate, for example, the four optical modulators 20A, 20B, 20C, and 20D are arranged in parallel. The semiconductor optical modulator 13 has two optical output ports 12a and 12b and one optical input port 12c. One end of a single optical input waveguide 40 is connected to the optical input port 12c.

The other end of the optical input waveguide 40 is connected to an input end of a 1×2 multi-mode interference (MMI) coupler 41. Two output ends of the 1×2 MMI coupler 41 are connected to input ends of two 1×2 MMI couplers 42A and 42B through curved waveguides 41A and 41B, respectively. Two output ends of the 1×2 MMI coupler 42A are connected to input ends of two 1×2 MMI couplers 44A and 44B through curved waveguides 43A and 43B, respectively. Two output ends of the 1×2 MMI coupler 42B are connected to input ends of two 1×2 MMI couplers 44C and 44D through curved waveguides 43C and 43D, respectively.

Two output ends of the 1×2 MMI coupler 44A are connected to modulation waveguides 44A-3 and 44A-4 through curved waveguides 44A-1 and 44A-2, respectively. Two output ends of the 1×2 MMI coupler 44B are connected to modulation waveguides 44B-3 and 44B-4 through curved waveguides 44B-1 and 44B-2, respectively. Two output ends of the 1×2 MMI coupler 44C are connected to modulation waveguides 44C-3 and 44C-4 through curved waveguides 44C-1 and 44C-2, respectively. Two output ends of the 1×2 MMI coupler 44D are connected to modulation waveguides 44D-3 and 44D-4 through curved waveguides 44D-1 and 44D-2, respectively.

The modulation waveguides 44A-3 and 44A-4 are connected to two input ends of a 1×2 MMI coupler 45A through curved waveguides 44A-5 and 44A-6, respectively. The modulation waveguides 44B-3 and 44B-4 are connected to two input ends of a 1×2 MMI coupler 45B through curved waveguides 44B-5 and 44B-6, respectively. The modulation waveguides 44C-3 and 44C-4 are connected to two input ends of a 1×2 MMI coupler 45C through curved waveguides 44C-5 and 44C-6, respectively. The modulation waveguides 44D-3 and 44D-4 are connected to two input ends of a 1×2 MMI coupler 45D through curved waveguides 44D-5 and 44D-6, respectively.

Respective one output ends of the 1×2 MMI couplers 45A and 45B are connected to input ends of a 2×2 MMI coupler 56A through curved waveguides 55A and 55B, respectively. Respective one output ends of the 1×2 MMI couplers 45C and 45D are connected to input ends of a 2×2 MMI coupler 5613 through curved waveguides 55C and 55D, respectively. One output end of the 2×2 MMI coupler 56A is connected to the optical output port 12a. One output end of the 2×2 MMI coupler 56B is connected to the optical output port 12b.

As illustrated in FIG. 2, each of the first optical modulator 20A, the second optical modulator 20B, the third optical modulator 20C, and the fourth optical modulator 20D includes the MZ modulator. The first optical modulator 20A includes the 1×2 MMI coupler 44A, one modulation waveguide (first waveguide arm) 44A-3, the other modulation waveguide (second waveguide arm) 44A-4, and the 1×2 MMI coupler 45A. The second optical modulator 20B includes the 1×2 MMI coupler 44B, one modulation waveguide (first waveguide arm) 44B-3, the other modulation waveguide (second waveguide arm) 44B-4, and the 1×2 MMI coupler 45B. The third optical modulator 20C includes the 1×2 MMI coupler 44C, one modulation waveguide (first waveguide arm) 44C-3, the other modulation waveguide (second waveguide arm) 44C-4, and the 1×2 MMI coupler 45C. The fourth optical modulator 20D includes the 1×2 MMI coupler 44D, one modulation waveguide (first waveguide arm) 44D-3, the other modulation waveguide (second waveguide arm) 44D-4, and the 1×2 MMI coupler 45D. In the optical modulator module 11 according to the embodiment, the MZ modulator is constituted by the two waveguide arms and modulation electrodes through which drive signals are supplied to those waveguide arms.

The electrical wiring layout of the semiconductor optical modulator 13 will be described below with reference to FIG. 2.

In the optical modulator module 11, the semiconductor optical modulator 13 includes a first group of wiring lines 37a connecting the first group of inputs 14 to the first group of optical modulators 31, respectively, and a second group of wiring lines 37b connecting the second group of inputs 16 to the second group of optical modulators 33, respectively.

The semiconductor optical modulator 13 includes a first line 35a and a second line 35b connecting the first input 14a and the second input 14b to the first optical modulator 20A and the second optical modulator 20B, respectively. The semiconductor optical modulator 13 further includes a third line 35c and a fourth line 35d connecting the third input 14c and the fourth input 14d to the third optical modulator 20C and the fourth optical modulator 20D, respectively. While the wiring layout is not limited to one illustrated in FIGS. 1 and 2, the first line 35a, the second line 35b, the third line 35c, and the fourth line 35d are routed in the embodiment such that respective wiring lengths of those lines are substantially the same. As a result, respective delays of electrical signals on the first line 35a, the second line 35b, the third line 35c, and the fourth line 35d are made substantially equal to each other.

Figure 3A:
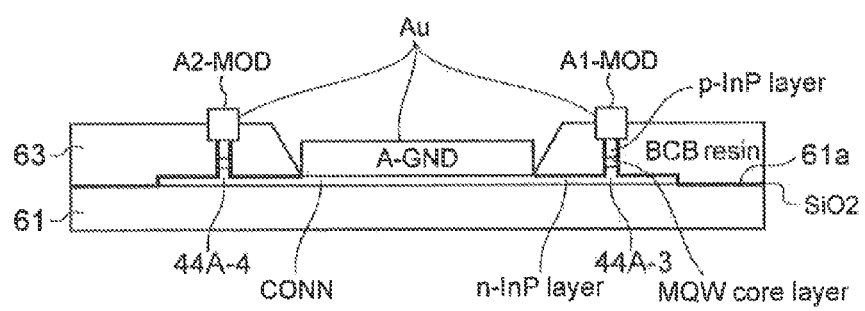
FIGS. 3A to 3C illustrate one example of structure of the optical waveguides and waveguide arms of Mach-Zehnder (MZ) modulators illustrated in FIGS. 1 and 2.
Figure 3B:
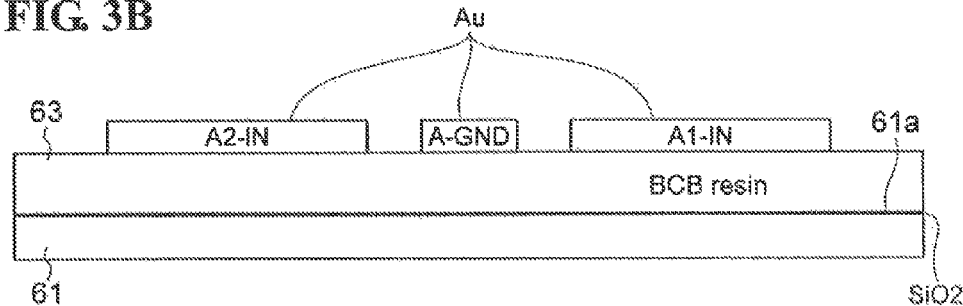
Figure 3C:
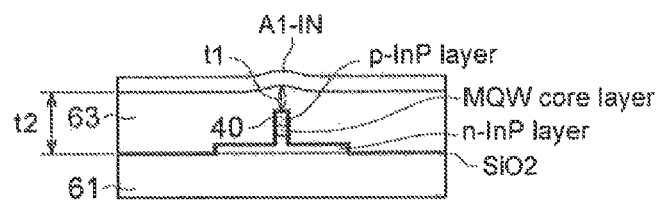

FIGS. 3A to 3C illustrate one example of structure of the optical waveguides and the modulation waveguides (e.g., the waveguide arms) of the MZ modulators illustrated in FIGS. 1 and 2. The semiconductor optical modulator 13 includes a resin body 63 in which optical elements on an InP substrate 61 are buried. The optical elements include, e.g., the semiconductor modulator 30, the optical demultiplexer 27, the optical multiplexer 29, and the optical waveguides optically coupling those components to each other. The resin body 63 used here has a smaller dielectric constant than silicon dioxide. The resin body 63 is made of a resin, such as a benzocyclobutene (BCB) resin or a polyimide resin.

The electrical inputs 14a to 14d and the optical modulators 20A to 20D are connected to each other through differential transmission lines as follows. As illustrated in FIG. 3A, for example, the differential transmission lines connecting the electrical input 14a and the optical modulator 20A include a first conductor, a second conductor, and a third conductor. The first conductor connects the first electrode of the electrical input 14a to a first semiconductor layer of the first waveguide arm 44A-3 of the optical modulator 20A. The second conductor connects the second electrode of the electrical input 14a to a second semiconductor layer of the second waveguide arm 44A-4 of the optical modulator 20A. The third conductor connects the common electrode of the electrical input 14a to a third semiconductor layer of the first waveguide arm 44A-3 of the optical modulator 20A and to a fourth semiconductor layer of the second waveguide arm 44A-4 of the optical modulator 20A. A p-InP layer (first semiconductor layer) of the first waveguide arm 44A-3 and a p-InP layer (second semiconductor layer) of the second waveguide arm 44A-4 are each made of a semiconductor having a first conductivity type such as p-type InP. An n-InP layer (third semiconductor layer) of the first waveguide arm 44A-3 and an n-InP layer (fourth semiconductor layer) of the second waveguide arm 44A-4 are each made of a semiconductor having a second conductivity type such as n-type InP. In the embodiment, the first conductivity type is p-type and the second conductivity type is n-type. As illustrated in FIG. 3B, each of the first conductor, the second conductor, and the third conductor has a portion extending on the resin body 63. As illustrated in FIGS. 1 and 2, the first conductor, the second conductor, and the third conductor are disposed on the resin body 63 in parallel. The third conductor is positioned between the first conductor and the second conductor. In the semiconductor optical modulator 13 according to the embodiment, the semiconductor modulator 30 and the optical demultiplexer 27 are buried in the resin body 63 having a lower dielectric constant than silicon dioxide. The first conductor and the second conductor are connected to the first waveguide arm 44A-3 and the second waveguide arm 44A-4, respectively. The third conductor is disposed between the first conductor and the second conductor in parallel to those conductors. The differential transmission lines to drive the MZ modulator are constituted by the first conductor, the second conductor, and the third conductor. Therefore, the number of wiring lines required for driving one MZ modulator is three.

The individual optical modulators are described in more detail below. In the first optical modulator 20A, modulation electrodes A1-MOD and A2-MOD are connected onto the modulation optical waveguides 44A-3 and 44A-4, respectively. More specifically, those modulation electrodes apply potentials to upper cladding layers of the corresponding modulation optical waveguides through uppermost layers thereof.

Respective one ends of the modulation electrodes A1-MOD and A2-MOD are connected to a first input RF-IN1 through wiring conductors A1-IN and A2-IN. The first input RF-IN1 receives a radio-frequency (RF) electrical signal. The first input RF-IN1 has an eleventh input end RF-IN11 and a twelfth input end RF-IN12. A wiring group includes an eleventh wiring conductor A1-IN, a twelfth wiring conductor A2-IN, and a first ground conductor A-GND. The eleventh wiring conductor A1-IN connects the modulation electrode A1-MOD to the eleventh input end RF-IN11. The modulation electrode A1-MOD is positioned on a first cladding layer of the first waveguide arm (44A-3) of the first optical modulator 20A. Similarly, the twelfth wiring conductor A2-IN connects the modulation electrode A2-MOD to the twelfth input end RF-IN12. The modulation electrode A2-MOD is positioned on a first cladding layer of the second waveguide arm (44A-4) of the first optical modulator 20A. The first ground conductor A-GND extends between the eleventh wiring conductor A1-IN and the twelfth wiring conductor A2-IN. The first ground conductor A-GND is connected to a second cladding layer between the first waveguide arm (44A-3) and the second waveguide arm (44A-4) of the first optical modulator 20A. The first ground conductor A-GND in the first optical modulator 20A corresponds to a modulator common electrode of the Mach-Zehnder modulator in the embodiment. In the optical modulator module 11 according to the embodiment, the wiring conductor A1-IN, the ground conductor A-GND, and the wiring conductor A2-IN are arranged in parallel over a span from the first input RF-IN1 to the corresponding waveguide arms in such a state that the ground conductor A-GND is sandwiched between the wiring conductor A1-IN and the wiring conductor A2-IN. With that arrangement, respective lengths of the above-mentioned conductors are made equal to one another. The above-described wiring structure for the first optical modulator 20A is similarly applied to the second, third, and fourth optical modulators 20B, 20C, and 20D.

The ground conductor A-GND extends between the wiring conductor A1-IN and the wiring conductor A2-IN. The ground conductor A-GND applies a potential to respective lower cladding layers of the corresponding modulation optical waveguides. Respective other ends of the modulation electrodes A1-MOD and A2-MOD are connected respectively to termination wiring conductors A1-T and A2-T. The termination wiring conductors A1-T and A2-T extend up to the third edge 13c. The ground conductor A-GND extends between the termination wiring conductors A1-T and A2-T. A signal line connecting the RF signal input RF-IN1 and the modulation electrode has a wiring structure (referred to as an "SGS structure") in which one ground conductor and two signal conductors extend in parallel with the ground conductor sandwiched between the signal conductors. A signal line connecting the termination element and the modulation electrode also has the SGS structure in which one ground conductor and two signal conductors extend in parallel with the ground conductor sandwiched between the signal conductors.

In the optical modulator 20B, respective one ends of modulation electrodes B1-MOD and B2-MOD are connected to an RF signal input RF-IN2 through wiring conductors B1-IN and B2-IN, respectively. A ground conductor B-GND extends between the wiring conductors B1-IN and B2-IN. The ground conductor B-GND applies a potential to respective lower cladding layers of the corresponding modulation optical waveguides. Respective other ends of the modulation electrodes B1-MOD and B2-MOD are connected to termination wiring conductors B1-T and B2-T. The termination wiring conductors B1-T and B2-T extend up to the third edge 13c. The ground conductor B-GND extends between the termination wiring conductors B1-T and B2-T. A signal line connecting the RF signal input RF-IN2 and the modulation electrode has the SGS structure in which one ground conductor and two signal conductors extend in parallel with the ground conductor sandwiched between the signal conductors.

In the optical modulator 20C, respective one ends of modulation electrodes C1-MOD and C2-MOD are connected to an RF signal input RF-IN3 through wiring conductors C1-IN and C2-IN, respectively. A ground conductor C-GND extends between the wiring conductors C1-IN and C2-IN. The ground conductor C-GND applies a potential to respective lower cladding layers of the corresponding modulation optical waveguides. Respective other ends of the modulation electrodes C1-MOD and C2-MOD are connected to termination wiring conductors C1-T and C2-T. The termination wiring conductors C1-T and C2-T extend up to the fourth edge 13d. The ground conductor C-GND extends between the termination wiring conductors C1-T and C2-T. A signal line connecting the RF signal input RF-IN3 and the modulation electrode has the SGS structure in which one ground conductor and two signal conductors extend in parallel with the ground conductor sandwiched between the signal conductors.

In the optical modulator 20D, respective one ends of modulation electrodes D1-MOD and D2-MOD are connected to an RF signal input RF-IN4 through wiring conductors D1-IN and D2-IN, respectively. A ground conductor D-GND extends between the wiring conductors D1-IN and D2-IN. The ground conductor D-GND applies a potential to respective lower cladding layers of the corresponding modulation optical waveguides. Respective other ends of the modulation electrodes D1-MOD and D2-MOD are connected to termination wiring conductors D1-T and D2-T. The termination wiring conductors D1-T and D2-T extend up to the fourth edge 13d. The ground conductor D-GND extends between the termination wiring conductors D1-T and D2-T. A signal line connecting the RF signal input RF-IN4 and the modulation electrode has the SOS structure in which one ground conductor and two signal conductors extend in parallel with the ground conductor sandwiched between the signal conductors. A time until the electrical signal arrives at the modulation waveguide depends on a length of the wiring conductor.

FIG. 3A illustrates a section taken along a line I-I in FIG. 2. The two waveguide arms of the optical modulator 20A appear in the section illustrated in FIG. 3A. The waveguide arm of the optical modulator 20A has a mesa structure. RF modulation signals are input to the RF signal inputs RF-IN1 to RF-IN4. The drive circuit 17 applies differential signals to the wiring conductors A1-IN and A2-IN (B1-IN and B2-IN, C1-IN and C2-IN, or D1-IN and D2-IN) with respect to the ground conductor A-GND (B-GND, C-GND, or D-GND). Those differential signals are applied to a pair of waveguide arms with respect to a common ground conductor that is connected between the pair of waveguide arms. A lower cladding layer extends from one of the pair of waveguide arms to the other waveguide arm in a direction perpendicular to the extending direction of the waveguide arms. Furthermore, the lower cladding layer extends in the extending direction of the waveguide arms. As illustrated in FIG. 3A, the modulation waveguide has a stacked semiconductor layer including a lower second cladding layer, a core layer, an upper first cladding layer, and a p-type contact layer. The lower second cladding layer is made of n-type InP, for example. The core layer includes a multi-quantum well (MQW) structure made of GaInAsP or AlGaInAs, for example. The upper first cladding layer is made of p-type InP, for example. The p-type contact layer is made of p-type InGaAs, for example. The stacked semiconductor layer is disposed on the semi-insulating InP substrate. A side surface of the waveguide arm having the mesa structure is buried with a buried region 63. The buried region 63 is also formed on the waveguide arm. The buried region 63 is formed of a resin body made of a BCB resin, for example. The buried region 63 has an opening (first or second opening) formed on the mesa structure of the waveguide arm (modulation waveguide). A top surface of the mesa structure, that is a top surface of the p-type contact layer in the embodiment, is exposed through the opening formed on the mesa structure. The buried region 63 further has an opening (third opening) that reaches the lower cladding layer at a position between the pair of waveguide arms. Electrical connection to the upper and lower cladding layers is established through those openings.

FIG. 3B illustrates a section taken along a line II-II in FIG. 2. A group of wiring lines connected to the modulation electrodes of the optical modulator 20A appear in the section illustrated in FIG. 3B. More specifically, FIG. 3B illustrates the pair of wiring conductors and the ground conductor disposed between those wiring conductors. The pair of wiring conductors and the ground conductor are formed on the buried region 63 made of a resin and is connected to one MZ modulator.

FIG. 3C illustrates a section taken along a line III-III in FIG. 2. As illustrated in FIG. 2, the pair of wiring conductors connected to the optical modulator 20A and the ground conductor disposed between those wiring conductors pass above the optical waveguide 40 extending toward the optical modulator 20A. The optical waveguide 40 has a mesa structure. The optical waveguide 40 has a stacked semiconductor layer including a lower second cladding layer, a core layer, and an upper first cladding layer. The lower second cladding layer is made of n-type InP, for example. The core layer includes a multi-quantum well (MQW) structure made of GaInAsP or AlGaInAs, for example. The upper first cladding layer is made of p-type InP, for example. The stacked semiconductor layer is disposed on the semi-insulating InP substrate. The optical waveguide 40 having the mesa structure is buried with a buried region 63. Specifically, a top surface and a side surface of the mesa structure of the optical waveguide 40 are embedded by the buried region 63. The buried region 63 is formed of, as described above, the resin body made of the BCB resin, for example.

Respective surfaces of the optical modulator 20A and the (input/output) optical waveguides connected to the optical modulator 20A are covered with an insulating film, such as a $SiO_2$ film or a SiN film. A structure of the resin body is designed by the electromagnetic field simulation method such that the differential transmission lines have an impedance of 90Ω, for example. When the resin body 63 is made of the BCB resin, for example, a thickness of the resin body 63 covering the optical modulator 20A is preferably 5 µm or more. A thickness t1 of the resin body 63 positioned on the optical waveguide 40 connected to the semiconductor modulator 30 is preferably 2 µm or more as shown in FIG. 3C. In addition, a thickness t2 of the resin body 63 positioned between the wiring conductors A1-IN and A2-IN connected to the optical modulator 20A and a principal surface of the semi-insulating InP substrate is preferably 5 µm or more as shown in FIG. 3C. Here, a height of the mesa structure of the optical waveguide is 1.5 µm to 3.5 µm. As illustrated in FIG. 3C, the thickness of the resin body 63 is not uniform near the optical waveguide 40 that is connected to the semiconductor modulator 30.

While the above description is made taking the optical modulator 20A as an example, not only the optical modulator 20A, but also the optical modulators 20B to 20D are constituted similarly as described below.

Some or all of respective first conductors (A1-IN, B1-IN, C1-IN and D1-IN), respective second conductors (A2-IN, B2-IN, C2-IN and D2-IN), and respective third conductors (A-GND, B-GND, C-GND and D-GND) in the optical modulators 20A to 20D pass over the optical waveguides 40, 41A, 41B, and 43A to 43D that are optically coupled to the optical modulators 20A to 20D. The resin body 63 is disposed between those conductors (first and second conductors) and the optical waveguides 40, 41A, 41B, and 43A to 43D. The first conductors and the second conductors are disposed on the resin body 63. The resin body 63 is formed on the side surfaces and top surfaces of the optical waveguides 40, 41A, 41B, and 43A to 43D. The resin body 63 is also formed on the semi-insulating InP substrate 61. Each of the optical waveguides 40, 41A, 41B, and 43A to 43D may include a III-V group compound semiconductor layer having a first conductivity type, a III-V group compound semiconductor layer having a second conductivity type, and an i-type (non-doped) semiconductor layer containing the MQW structure. The i-type semiconductor layer is disposed between the III-V group compound semiconductor layer having the first conductivity type and the III-V group compound semiconductor layer having the second conductivity type.

In the semiconductor optical modulator 13 according to the embodiment, the first conductor (A1-IN, B1-IN, C1-IN or D1-IN), the second conductor (A2-IN, B2-IN, C2-IN or D2-IN), and the third conductor (A-GND, B-GND, C-GND or D-GND) of the differential transmission lines are arranged on the resin body 63 in parallel such that the third conductor is arranged between the first conductor and the second conductor. Thus, the third conductor is positioned between the first conductor and the second conductor. In other words, the embodiment employs a differential transmission line structure in which the third conductor (A-GND, B-GND, C-GND or D-GND) is positioned between the first conductor (A1-IN, B1-IN, C1-IN or D1-IN) and the second conductor (A2-IN, B2-IN, C2-IN or D2-IN) without arranging conductors connected to the common electrode at positions outside the first conductor and the second conductor. Therefore, an increase in total area of the conductors on the resin body 63 can be avoided. It is hence possible to reduce an increase of stress in the resin body 63 due to the difference in thermal expansion coefficients between the resin body 63 and the first to third conductors formed on the resin body 63.

Comparing the arrangement of the conductors in FIG. 3A with the arrangement of the conductors in FIG. 3B, the wiring structure of the semiconductor optical modulator 13 is described below in connection with the optical modulator 20A, for example. In the optical modulator 20A, a width of the ground electrode (i.e., the electrode A-GND in FIG. 3A) contacting with respective lower semiconductor layers of the first waveguide arm and the second waveguide arm is greater than a width of the electrode (i.e., the electrode A1-MOD in FIG. 3A) contacting with the first semiconductor layer of the first waveguide arm and than a width of the electrode (i.e., the electrode A2-MOD in FIG. 3A) contacting with the second semiconductor layer of the second waveguide arm. A width of the third conductor (i.e., the electrode A-GND in FIG. 3B) is smaller than a width of the first conductor (i.e., the electrode A1-IN in FIG. 3B) and than a width of the second conductor (i.e., the electrode A2-IN is FIG. 3B). Studies based on the electromagnetic field simulation prove that, in the differential transmission lines, a microwave loss can be suppressed lower when the first conductor and the second conductor have greater widths than that of the third conductor.

As illustrated in FIG. 3A, the semiconductor optical modulator 13 may further include a connecting semiconductor layer (n-InP) that connects the third semiconductor layer (n-InP) of the first waveguide arm 44A-3 and the fourth semiconductor layer (n-InP) of the second waveguide arm 44A-4 to each other. The third semiconductor layer (n-InP), the connecting semiconductor layer (n-InP), and the fourth semiconductor layer (n-InP) include an n-type semiconductor layer CONN that extends along a principal surface 61a of the InP substrate 61. The n-type semiconductor layer CONN is made of n-InP, for example. A width WN1 of the n-type semiconductor layer CONN is greater than a width (waveguide width) of the first semiconductor layer (n-InP) of the first waveguide arm 44A-3 and than a width (waveguide width) of the second semiconductor layer (n-InP) of the second waveguide arm 44A-4. The third conductor A-GND is contacted with the n-type semiconductor layer CONN between the first waveguide arm 44A-3 and the second waveguide arm 44A-4 through an opening (third opening) in the resin body 63. In the semiconductor optical modulator 13 according to the embodiment, with intent to employ differential propagation lines including a less number of wiring conductors, an electrical signal from the first waveguide arm 44A-3 is conducted from the third semiconductor layer (n-InP) to the third conductor A-GND through the connecting semiconductor layer (n-InP). Furthermore, an electrical signal from the second waveguide arm 44A-4 is conducted from the fourth semiconductor layer (n-InP) to the third conductor A-GND through the connecting semiconductor layer (n-InP). The differential signals are applied to the first waveguide arm 44A-3 and the second waveguide arm 44A-4 in opposite phases to each other. The electrical signals in opposite phases applied to the first waveguide arm 44A-3 and the second waveguide arm 44A-4 are propagated to the connecting semiconductor layer (n-InP).

The optical modulator module 11 according to the embodiment will be further described below with reference to FIG. 1 again. The optical modulator module 11 includes a housing 36, an output optical fiber 38a, and an optical input fiber 38b. For example, a single-mode fiber is used as the output optical fiber 38a. A polarization maintaining fiber is used as the optical input fiber 38b. When the optical modulator module 11 receives a transverse electric (TE)-polarized light from the polarization maintaining fiber, for example, the optical modulator module 11 provides TE-polarized and transverse magnetic (TM)-polarized lights, which are modulated in phase, to the single-mode fiber.

The housing 36 contains the semiconductor optical modulator 13, the first mirror 21a, the polarization rotator 23, the polarization multiplexer 25, and the drive circuit 17. The housing 36 includes one end 36a and the other end 36b. The one end 36a is positioned on the opposite side to the other end 36b. Moreover, the housing 36 includes one lateral end 36c and the other lateral end 36d. The one lateral end 36c and the other lateral end 36d extend in the direction of the first axis Ax1. The one lateral end 36c is positioned on the opposite side to the other lateral end 36d.

The output optical fiber 38a is disposed at the one end 36a of the housing 36 and is optically coupled to the polarization multiplexer 25. The optical input port 12c of the semiconductor optical modulator 13 is optically coupled to the input optical fiber 38b. The housing 36 includes an array of terminals disposed at the other end 36b of the housing 36. The array of terminals is connected to the drive circuit 17. The drive circuit 17 includes drivers 17a, 17b, 17c and 17d, for example. In the optical modulator module 11 according to the embodiment, the output optical fiber 38a is disposed at the one end 36a of the housing 36. The array of terminals connected to the drive circuit 17 is disposed at the other end 36b on the opposite side to the one end 36a of the housing 36. Therefore, the array of input terminals for the electrical signals is not affected by the arrangement of the optical output in the housing 36.

The optical modulator module 11 further includes a second mirror 21b disposed within the housing 36. The input optical fiber 38b is disposed at the one end 36a of the housing 36. The optical input port 12c is positioned at the third edge 13c of the semiconductor optical modulator 13. The input optical fiber 38b is optically coupled to the optical input port 12c through the second mirror 21b.

In the optical modulator module 11 according to the embodiment, the array of terminals connected to the drive circuit 17 is not positioned at the one lateral end 36c and the other lateral end 36d. Such a configuration ensures that the input terminals for the electrical signals are positioned at the end 36b without being influenced by a position of the optical input in the housing 36. Furthermore, signal lines extending from the terminal array to the drive circuit 17 do not include bent portions. A loss of the electrical signal under high-speed modulation occurs in a curved portion of the transmission line. It is hence possible to suppress losses of the electrical signals under high-speed modulation in the optical modulator module 11 according to the embodiment.

In the optical modulator module 11, optical lenses 34a, 34b, 34c, 34d and 34e may be used for increasing the optical coupling efficiency.

The optical modulator module 11 further includes a board 39. A principal surface 39a of the board 39 includes a first area 39b, a second area 39c, and a third area 39d. The first area 39b, the second area 39c, and the third area 39d are arrayed in the direction of the first axis Ax1. The first area 39b of the board 39 mounts thereon the drive circuit 17 and a relay board 49. The second area 39c mounts thereon the semiconductor optical modulator 13. The third area 39d mounts thereon the polarization multiplexing device 15. Each of the optical modulators 20A to 20D of the semiconductor optical modulator 13 includes a plurality of semiconductor layers disposed on the semi-insulating InP substrate. The drive circuit 17, an electro-optical transducer (e.g., the semiconductor optical modulator 13), and the polarization multiplexing device 15 are successively arranged on the single board 39 in order.

Figure 4:
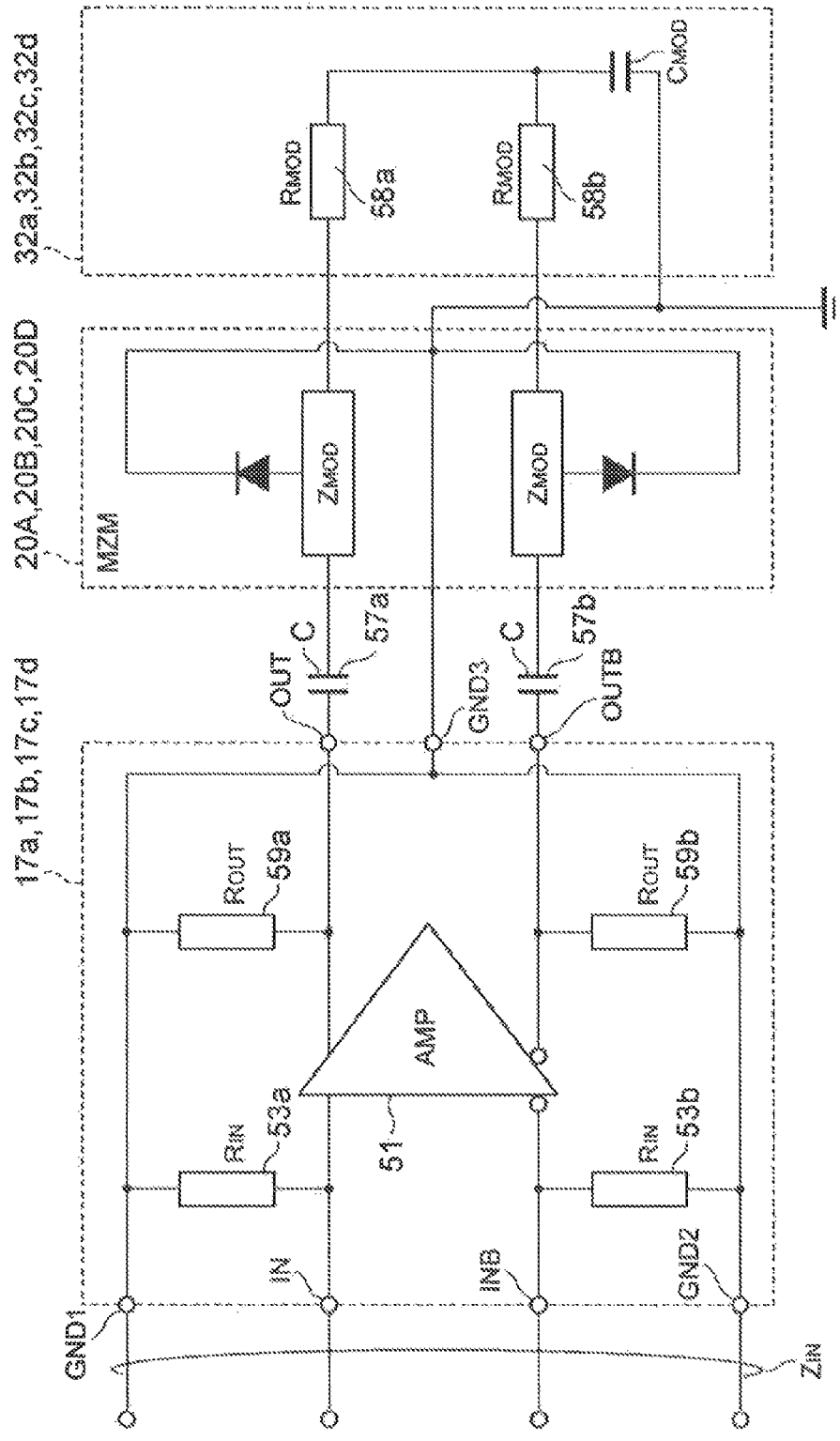
FIG. 4 illustrates a configuration of a drive circuit.

FIG. 4 illustrates a configuration of the drive circuit 17. The drivers 17a, 17b, 17c and 17d of the drive circuit 17 are described below. Each of the drivers 17a, 17b, 17c and 17d includes a differential amplifier 51. The differential amplifier 51 includes differential inputs IN and INB, and differential outputs OUT and OUTB. The differential inputs IN and INB receive differential signals from the outside. The differential outputs OUT and OUTB provide the amplified differential signals. The differential amplifier 51 of each of the drivers 17a, 17b, 17c and 17d includes a first input resistance ($R_{IN}$) 53a connected to the first input IN of the differential inputs, and a second input resistance ($R_{IN}$) 53b connected to the second input INB of differential inputs.

The differential amplifier 51 of each of the drivers 17a, 17b, 17c and 17d includes a first output resistance ($R_{OUT}$) 59a connected to the first output OUT of the differential outputs, and a second output resistance ($R_{OUT}$) 59b connected to the second output OUTB of the differential outputs. A first termination resistance ($R_{MOD}$) 58a is substantially equal to the first output resistance ($R_{OUT}$) 59a, and a second termination resistance ($R_{MOD}$) 58b is substantially equal to the second output resistance ($R_{OUT}$) 59b. In the optical modulator module 11, the drive circuit 17 performs impedance conversion by using the termination resistances ($R_{MOD}$) 58a and 58b and the output resistances ($R_{OUT}$) 59a and 59b.

A first impedance ($2R_{IN}$) of the drive circuit 17 is 100Ω. A differential impedance ($2Z_{MOD}$) of the waveguide arms in the semiconductor optical modulator 13 is in the range of 80Ω to 95Ω. A second impedance ($2R_{OUT}$) of the drive circuit 17 is 80Ω or more and 95Ω or less. A differential impedance of the electrical signal lines 47a, 47b, 47c and 47d on the relay board 49 is 80Ω or more and 95Ω or less. Thus, in the optical modulator module 11 according to the embodiment, the differential impedance of the electrical signal lines 47a, 47b, 47c and 47d on the relay board 49 is in the range of 80Ω or more and 95Ω or less. Therefore, narrowing of a transmission band is avoided in transmission of the differential signals from the drive circuit 17 to the semiconductor optical modulator 13. In addition, the drive circuit 17 is connected to the semiconductor optical modulator 13 through capacitors 57a and 57b.

The relay board 49 is made of a material having a thermal expansion coefficient and a dielectric constant that are suitable for propagation of high-frequency electrical signals. The electrical signal lines 47a, 47b, 47c and 47d disposed on the relay board 49 are each made of a metal thin film formed in wiring patterns. For the relay board 49, a ceramic multilayer substrate made of a ceramic material, such as alumina ($Al_2O_3$) or aluminum nitride (AlN) is used, for example. The ceramic multilayer substrate may be formed by stacking layers made of different types of materials. Using different types of materials is effective in increasing a degree of freedom in designing frequency dependency of loss and an impedance with respect to the high-frequency signal. The ceramic material is easily formed into the desired shape by, for example, grinding into the desired thickness and punching. Furthermore, the ceramic material is stable chemically and thermally. Accordingly, wiring lines made of various types of metallic materials are disposed on the relay board 49 using the ceramic material. Thus, the relay board 49 enables the electrical signal lines to be formed with a lower loss over a wider frequency band. In addition, variations in impedance and loss attributable to variations in manufacturing are reduced by providing the electrical signal lines on the relay board 49.

As illustrated in FIGS. 1 and 2, the optical modulator module 11 includes signal transmission line terminators 32a, 32b, 32c and 32d mounted on the board 39. Hereinafter, the signal transmission line terminator 32a is denoted as "terminator 32a", for example. The terminator 32a is connected to the termination wiring conductors A1-T and A2-T. The terminator 32b is connected to the termination wiring conductors B1-T and B2-T. The terminator 32c is connected to the termination wiring conductors C1-T and C2-T. The terminator 32d is connected to the termination wiring conductors D1-T and D2-T. Each of the terminators 32a, 32b, 32c and 32d includes a termination resistance and a capacitor. In this embodiment, when the impedance of the waveguide arm is 45Ω, the output resistance ($R_{OUT}$) of the drive circuit 17 is set to be 45Ω. The termination resistance ($R_{MOD}$) is also set to be 45Ω. A capacitance C of each of the capacitors 57a and 57b through which the drive circuit 17 and the semiconductor optical modulator 13 are coupled to each other is 0.1 µF, for example.

In the optical modulator module 11, the drive circuit 17 has differential inputs including a first ground electrode GND1, a first input electrode IN, a second input electrode INB, and a second ground electrode GND2, those electrodes being arrayed in one direction. The drive circuit 17 further has differential outputs including a first output electrode OUT, a third ground electrode GND3, and a second output electrode OUTB, those electrodes being arrayed in one direction. The drive circuit 17 performs not only impedance conversion, but also conversion of wiring order. The differential transmission lines in the wiring order after being converted by the drive circuit 17 are constituted on the relay board 49. The differential signals transmitted through the differential transmission lines formed on the relay board 49 are applied to the semiconductor optical modulator 13. More specifically, the differential signals propagate through the differential transmission lines constituted by the first conductor, the third conductor, and the second conductor, which extend in parallel on the resin body 63 having the lower dielectric constant than silicon dioxide. Those differential signals transmitted through the differential transmission lines drive one MZ modulator.

The drivers 17a to 17d are each provided as a semiconductor integrated circuit, for example. A modulation signal applied through the input terminal IN is terminated at the input resistance $R_{IN}$ within each of the drivers 17a to 17d through the transmission line having a characteristic impedance Z. The input resistance $R_{IN}$ is set equal to the characteristic impedance $Z_{IN}$ in order to suppress reflection at the inputs of the drivers 17a to 17d. The differential amplifier (AMP) amplifies the terminated input signal until an amplitude of the received signal reaches a value necessary for modulating light propagating through a modulator MZM in response to the electrical signal amplified by the differential amplifier. The amplified signal is terminated at the output resistance $R_{OUT}$ and the termination resistance $R_{MOD}$. Each of the drivers 17a to 17d and the modulator MZM are connected to each other through the differential transmission lines. A capacitor C for blocking a DC current is inserted in each of conductive lines of the differential transmission lines. The characteristic impedance $Z_{MOD}$ of the modulator MZM is set to the differential impedance of 90Ω instead of being set to the general characteristic impedance of 50Ω. Thus, the output resistance $R_{OUT}$ of each of the drivers 17a to 17d, the termination resistance $R_{MOD}$, and the characteristic impedance of the differential transmission lines are set equal to the characteristic impedance $Z_{MOD}$ of the modulator MZM. Therefore, the drive circuit 17 has, in addition to the amplification function, the impedance conversion function (from $Z_{IN}$ to $Z_{MOD}$).

EXAMPLE

A stacked semiconductor layer including an n-type contact layer, an n-type lower cladding layer, a core layer (multi-quantum well (MQW) structure), a p-type upper cladding layer, and a p-type contact layer is formed on a semi-insulating InP substrate. For example, the organic-metal vapor phase epitaxy (MOVPE) method is used for epitaxial growth of those semiconductor layers.

One Example of Structure of Stacked Semiconductor Layer

N-type contact layer: Si-doped n-InP with thickness of 600 nm.

Lower cladding layer: Si-doped n-InP and i-InP. A dopant concentration of the n-InP is lower than that in the n-type contact layer. A thickness of the n-InP is 780 nm. The n-InP and the i-InP are arranged in the mentioned order in a direction toward the core layer from the substrate. A thickness of the i-InP is 20 nm.

Core layer: Multi-quantum well (MQW) structure including AlGaInAs layers (well layers) and AlInAs layers (barrier layers) stacked alternately. A thickness of the core layer is 500 nm. The well layer and barrier are formed of a semiconductor material lattice-matched to InP. A strained MQW structure in which the well layer has strain (for example, compressive strain) may be used as the MQW structure. In the case of the strained MQW structure, a strain compensated structure in which the barrier layer has an opposite strain with the well layer may also be used. A composition and a thickness of the well layer are adjusted such that a photoluminescence (PL) peak wavelength of the MQW structure is 1300 nm. For example, the composition of the well layer is adjusted such that the well layer has a band gap wavelength of 1385 nm.

Upper cladding layer: i-InP and Zn-doped p-InP. A dopant concentration of the p-InP is lower than that in the p-type contact layer. A thickness of the p-InP is 1000 nm. The i-InP and the p-InP are arranged in the mentioned order in the direction toward the core layer from the substrate. A thickness of the i-InP is 380 nm.

P-type contact layer: Zn-doped p-InGaAs with thickness of 150 nm.

Herein, the "i-layer" implies a total thickness of the i-InP layer of the lower cladding layer, the core layer, and the i-InP layer of the upper cladding layer. The total thickness is preferably in the range of 0.8 µm to 1.2 µm, for example. In this EXAMPLE, the total thickness is 0.9 µm, for example. Furthermore, the i-InP is defined as non-doped InP in which p-type and n-type dopants are not doped intentionally. The p-InP and p-InGaAs are defined as p-type InP and p-type InGaAs doped with a p-type impurity. The n-InP is defined as n-type InP doped with a n-type impurity.

After forming a mask on the stacked semiconductor layer, a mesa structure constituting the optical waveguide is formed by dry etching using the mask. The dry etching is performed by the inductively coupled plasma-reactive ion etching (ICP-RIE) using halogen-based etchant gas. A width of the optical waveguide in the semiconductor optical modulator 13 is in the range of 1.3 µm to 1.5 µm, for example. In this EXAMPLE, the width of the optical waveguide is 1.4 µm, for example. An etching depth for forming each mesa structure of the optical waveguide is 3 µm, for example. The n-type contact layer is exposed in a region that has been etched through the mesa forming process. A distance between the two waveguide arms of the MZ modulator is set to the range of 25 to 100 µm, for example. In this EXAMPLE, the distance between the two waveguide arms of the MZ modulator is 50 µm.

Then, an isolation mesa is formed by etching. Etching in this process is performed by the ICP-RIE method using halogen-based etchant gas, for example. Wet etching may be used instead. The two waveguide arms of the MZ modulator in the semiconductor optical modulator 13 and the n-type contact layer remaining between the two waveguide arms constitute each isolation mesa. By forming the isolation mesas, in an area where four semiconductor modulators are arrayed, an isolation area including the surface of the semi-insulating InP substrate is formed between adjacent two of four isolation mesas, including the n-type contact layers, for the individual MZ modulators. In an area where the two waveguide arms of the MZ modulator are formed, a width of the isolation mesa is 30 to 120 µm, for example. In this EXAMPLE, the width of the isolation mesa is 70 µm. A width of the isolation area may be set to be 180 to 270 µm, and it is 230 µm in this EXAMPLE. The isolation area acts to avoid capacitive coupling between the modulators and to prevent degradation of the high-frequency characteristics.

After forming the mesa structure constituting the optical waveguide and the isolation mesa, an insulating film is fowled on the entire surface of the InP substrate. The insulating film is made of silicon dioxide ($SiO_2$) or silicon nitride (SiN), for example. A thickness of the insulating film is 300 nm, for example. Next, a resin is formed on the insulating film such that the mesa structure constituting the optical waveguide and the isolation mesa are buried in the resin. The resin is made of benzocyclobutene (BCB), for example. In this EXAMPLE, a thickness t2 of a resin body formed on the flat surface of the InP substrate measured away from the mesa structure of the optical waveguide is 5 µm, for example. A thickness t1 of a resin body on the mesa structure of the optical waveguide is 2 µm, for example. The resin is formed by the spin coating method, for example. The thicknesses t1 and t2 of the resin body are adjusted by controlling coating conditions such as spin speed, spin time, and viscosity of the resin.

An opening (first or second opening) is formed in the resin body on the mesa structure of the optical waveguide for connection between the mesa structure of the optical waveguide and the electrode. The opening is formed as follows. The resin body and the insulating film are etched by dry etching to expose the surface of the p-type contact layer in the mesa structure of the optical waveguide. A metal layer is formed in the opening by using an evaporation method and a plating method. Thus, the electrode is formed on the mesa structure of the optical waveguide through the opening. In addition, a metal wiring line for the electrical signal line is formed. In this EXAMPLE, gold is used as an electrode material.

With the manufacturing method described above, a semiconductor optical modulator (for example, the semiconductor optical modulator 13) including a plurality of MZ modulators is fabricated. The semiconductor optical modulator includes one optical input waveguide, the optical demultiplexing waveguide, four pairs of modulation waveguides for MZ modulators, the optical multiplexing waveguide, two optical output waveguides, and the optical waveguides interconnecting those optical waveguides. The semiconductor optical modulator further includes four pairs of electrical signal input electrodes, four pairs of modulation electrodes, four pairs of electrical signal termination electrodes, the ground electrodes, and the electrical signal lines interconnecting those electrodes.

In the semiconductor optical modulator, for example, four MZ modulators are integrated on the InP substrate as in the semiconductor optical modulator 13 described above. Each of the MZ modulators includes one optical demultiplexing waveguide, two modulation waveguides, one optical multiplexing waveguide, two modulation electrodes, and one ground electrode. A phase adjustment waveguide and a phase adjustment electrode may be disposed between the modulation waveguide and the optical multiplexing waveguide. Two MZ modulators are connected through one optical demultiplexing waveguide and one optical multiplexing waveguide. Those two MZ modulators function as Quadrature Phase Shift Keying (QPSK) modulators. The semiconductor optical modulator may include an additional phase adjustment waveguide and phase adjustment electrode. Those phase adjustment waveguide and phase adjustment electrode are disposed between the optical multiplexing waveguide in each the MZ modulator and the optical multiplexing waveguide interconnecting the MZ modulators. Those two QPSK modulators are connected to the single optical demultiplexing waveguide that is in turn connected to the optical input waveguide, and they receive lights from the optical inputs. Respective optical multiplexing waveguides of the two QPSK modulators are connected to two ports (for example, two independent optical output waveguides) in one-to-one relation. The electrical signal input electrodes (for example, electrical input pad electrodes) and the four MZ modulators are preferably arrayed such that lengths of four sets of the electrical signal input electrodes are substantially equal to one another. In one example of such an arrangement, the electrical signal lines extend substantially straightforward from the electrical signal input electrodes to the modulation electrodes. The electrical signal input electrodes are positioned at the edge opposite to the edge at which the optical output ports are disposed. Furthermore, the optical input waveguide (for example, the optical input port) is positioned at the edge different from the edge at which the electrical signal input electrodes are disposed.

The electrical signal transmission lines extending from the electrical signal input electrodes to the modulation electrodes are each designed such that the differential impedance is 90Ω and the microwave loss is held low. The electromagnetic field simulation method using, for example, a high frequency structural simulator (HFSS) or a circuit simulator called Simulation Program with Integrated Circuit Emphasis (SPICE) is used for designing the electrical signal transmission lines.

Figure 5:
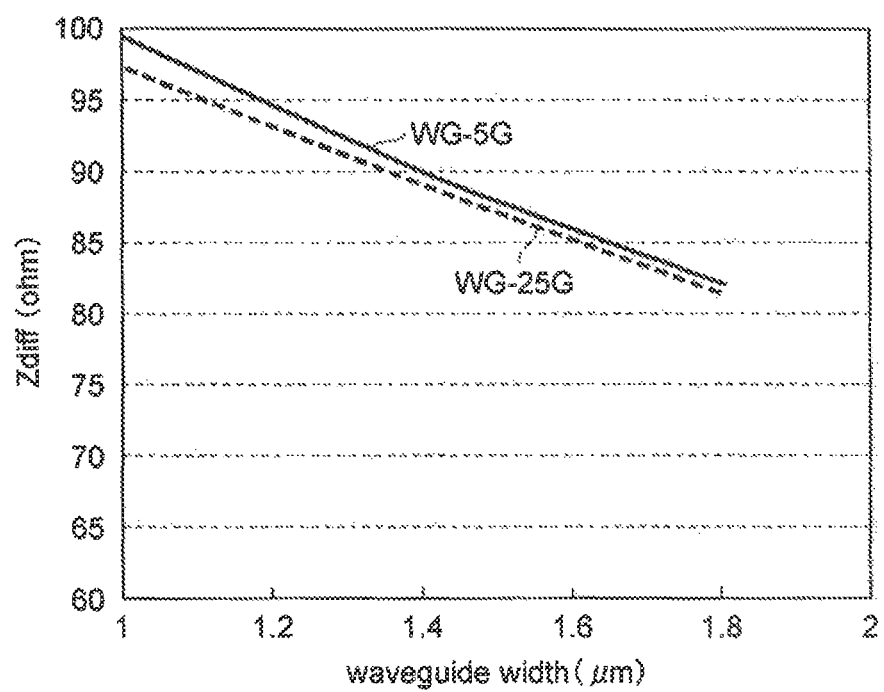
FIG. 5 is a graph plotting relationships between a width of an optical waveguide in a MZ modulator and a differential impedance (Zdiff) of the optical waveguide.

One example of simulation results calculated by using the above electromagnetic field simulation method will be described below. FIG. 5 represents relationships between a width of the optical waveguide in the MZ modulator and the differential impedance of the optical waveguide when the frequency of the electrical signal is 5 GHz and 25 GHz. In the simulation, the i-layer having a thickness of 0.9 μm in this EXAMPLE is used. Referring to FIG. 5, a solid line (WG-5G) and a dotted line (WG-25G) show the calculated results of differential impedance (Zdiff) at the frequency of 5 GHz and 25 GHz, respectively. In the range of the waveguide width from 1.0 to 1.8 μm, the differential impedance (WG-5G) at the frequency of 5 GHz is greater than the differential impedance (WG-25G) at the frequency of 25 GHz. Furthermore, the width of the optical waveguide exhibiting the differential impedance in the range of 80Ω or more is 1.9 μm or less, as shown in FIG. 5. Moreover, the width of the optical waveguide exhibiting the differential impedance in the range of 95Ω or less is 1.1 μm or more.

Figure 6:
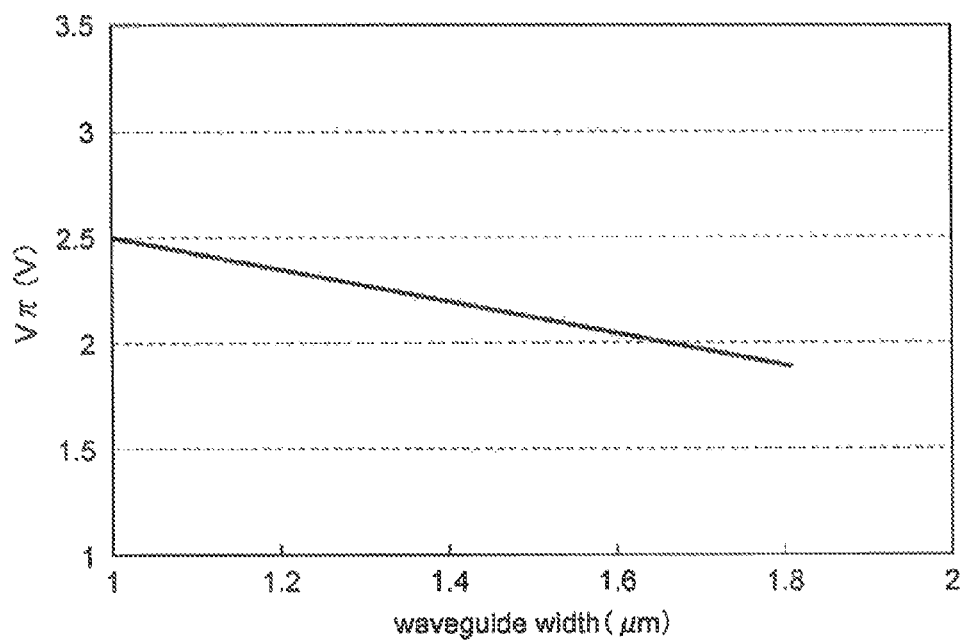
FIG. 6 is a graph plotting a relationship between the width of the optical waveguide in the MZ modulator and a voltage amplitude Vπ of an electrical signal for modulation.

FIG. 6 represents a relationship between the width of the optical waveguide in the MZ modulator and a voltage amplitude Vπ of an electrical signal for modulation. Here, the voltage amplitude Vπ of the electrical signal is defined as the voltage amplitude required to change the phase of light propagating through the modulation waveguide by π radians. The amount of phase change of π radians (180 degrees) is equal to half wavelength in terms of the optical path length. The thickness of the i-layer of the optical waveguide is set to 0.9 μm. Referring to FIG. 6, the voltage amplitude Vπ of the electrical signal required for obtaining the desired phase change (π radians) increases, as the waveguide width reduces in the range of the waveguide width from 1.0 to 1.8 μm. Such an increase of the voltage amplitude Vπ is disadvantageous in reducing the power consumption in the drive circuit. The differential impedance of the optical waveguide depends on the waveguide width more largely as compared with the voltage amplitude Vπ of the electrical signal.

Figure 7:
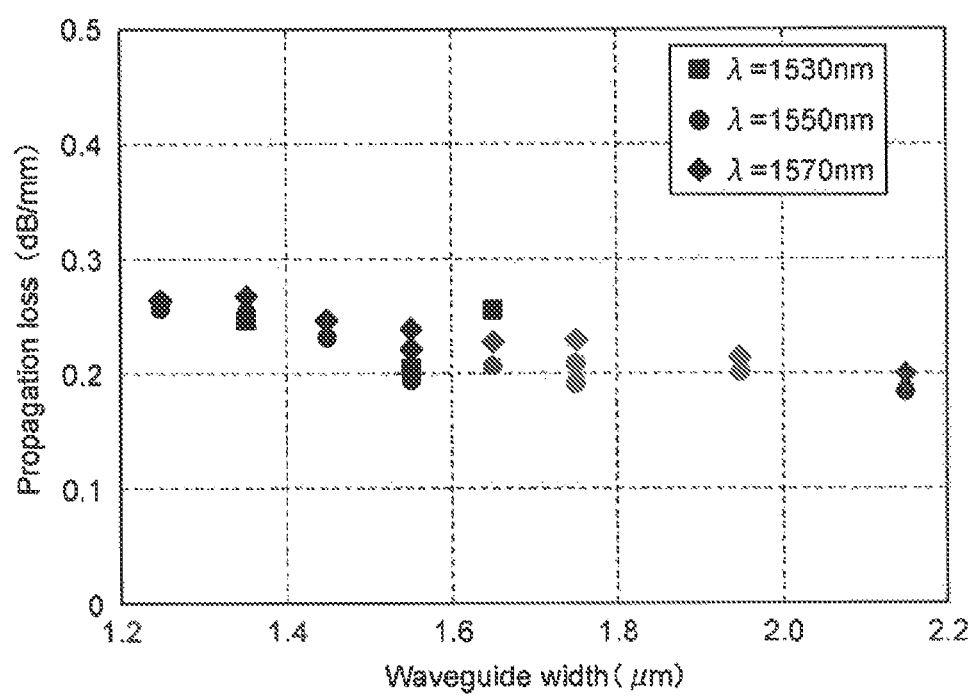
FIG. 7 is a graph plotting relationships between the width of the optical waveguide in the MZ modulator and a propagation loss in the optical waveguide.

FIG. 7 represents relationships between the width of the optical waveguide in the MZ modulator and a propagation loss in the optical waveguide. Referring to FIG. 7, the propagation loss is plotted for light wavelengths of 1530, 1550, and 1570 nm with respect to the range of the waveguide width from 1.2 to 2.2 μm. The optical propagation loss increases, as the width of the optical waveguide reduces.

Figure 8:
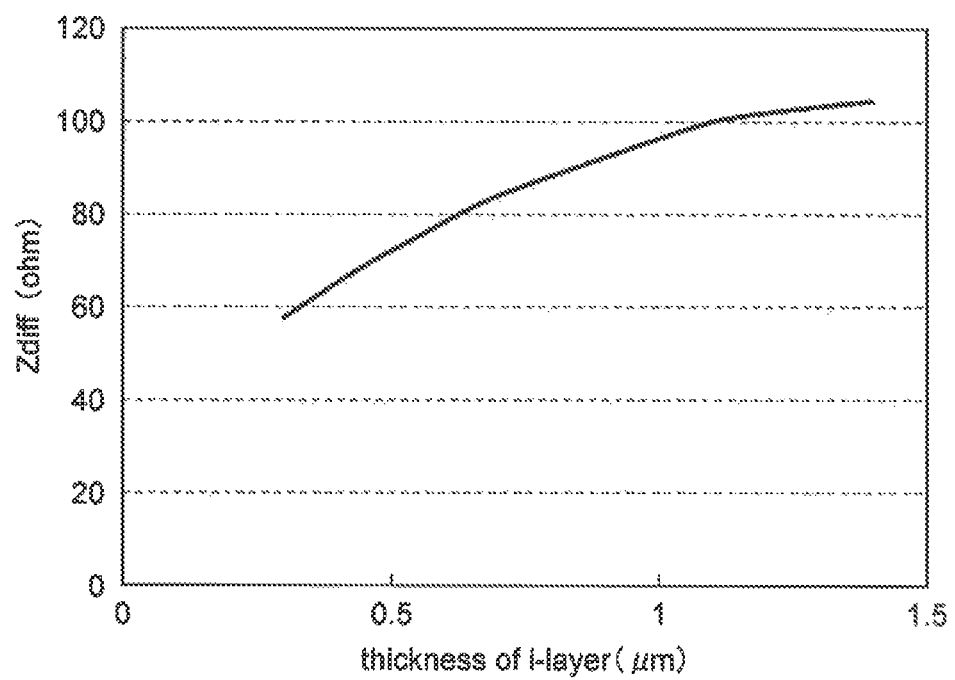
FIG. 8 is a graph plotting a relationship between a thickness of an i-layer of the optical waveguide in the MZ modulator and the differential impedance of the optical waveguide.

FIG. 8 represents a relationship between a thickness of the i-layer of the optical waveguide in the MZ modulator and the differential impedance (Zdiff) of the optical waveguide at the frequency of 25 GHz. The waveguide width is set to 1.3 μm. Referring to FIG. 8, the differential impedance at the frequency of 25 GHz depends on the thickness of the i-layer. At the waveguide width of 1.3 μm, the differential impedance of the optical waveguide is increased by increasing the thickness of the i-layer. The thickness of the i-layer of the optical waveguide exhibiting the differential impedance in the range of 80Ω or more is 0.65 μm or more, for example. The thickness of the i-layer of the optical waveguide exhibiting the differential impedance in the range of 95Ω or less is 1.0 μm or less, for example.

Figure 9:
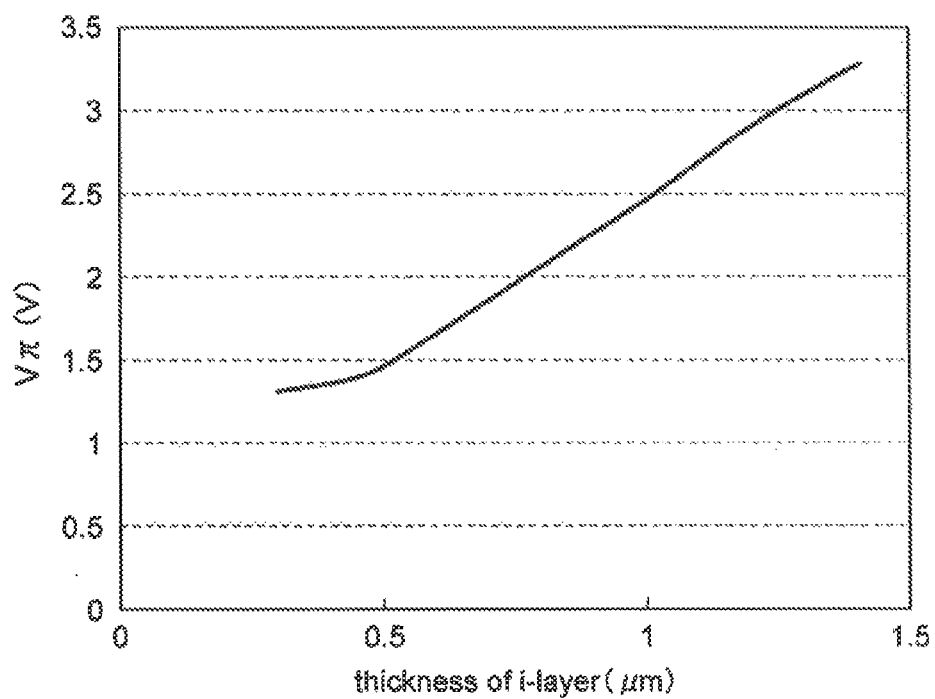
FIG. 9 is a graph plotting a relationship between the thickness of the i-layer of the optical waveguide in the MZ modulator and the voltage amplitude Vπ of the electrical signal for modulation.

FIG. 9 represents a relationship between the thickness of the i-layer of the optical waveguide in the MZ modulator and the voltage amplitude Vπ of the electrical signal for modulation. The thickness of the i-layer of the optical waveguide is in the range of 0.3 μm to 1.4 μm. Referring to FIG. 9, the voltage amplitude Vπ of the electrical signal required for obtaining the desired phase change (π radians) increases, as the thickness of the i-layer increases. Such an increase of the voltage amplitude is disadvantageous in reducing the power consumption in the drive circuit. A change in the differential impedance of the optical waveguide and a change in the voltage amplitude Vπ of the electrical signal greatly depend on the thickness of the i-layer of the optical waveguide.

Figure 10:
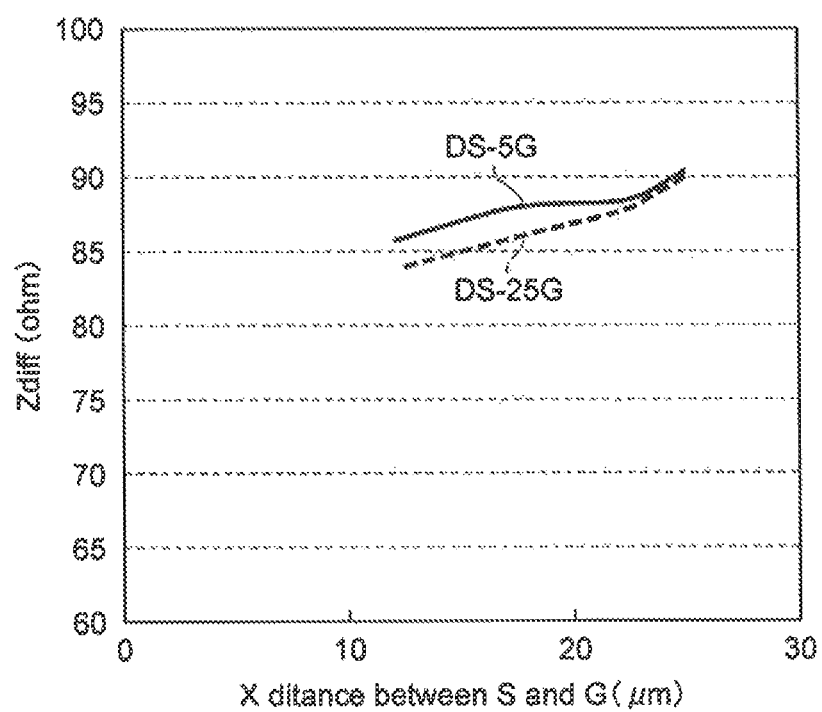
FIG. 10 is a graph plotting relationships between a distance X and the differential impedance (Zdiff) of the optical waveguide. The distance X is defined by a distance from a center of a modulation electrode S disposed on the optical waveguide to an end of a ground electrode G disposed between the optical waveguides in the MZ modulator.

FIG. 10 represents relationships between a distance X and the differential impedance (Zdiff) of the optical waveguide. The distance X is defined as a distance from a center of a modulation electrode S on the optical waveguide to an end of a ground electrode G between the optical waveguides in the MZ modulator. Referring to FIG. 10, a solid line (DS-5G) and a dotted line (DS-25G) show the calculated results of differential impedance (Zdiff) at the frequency of 5 GHz and 25 GHz, respectively. The differential impedance increases, as the distance X increases. In the range of the distance X from 12.5 μm to 25 μm, the differential impedance (DS-5G) at the frequency of 5 GHz is greater than the differential impedance (DS-25G) at the frequency of 25 GHz. The differential impedance in the range of 84 to 90Ω is obtained at the frequency of 5 GHz and 25 GHz.

Figure 11:
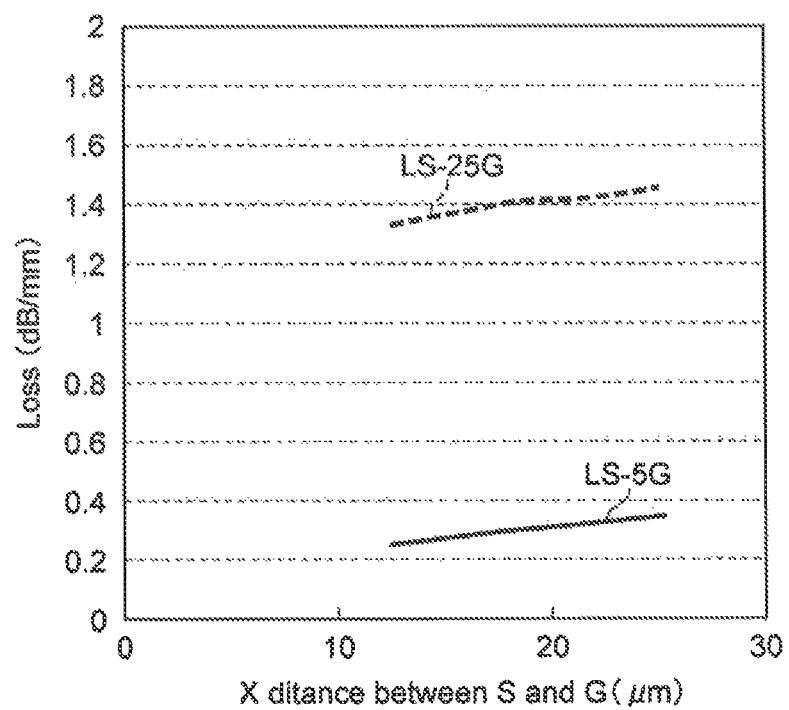
FIG. 11 is a graph plotting relationships between the distance X and a microwave propagation loss.

FIG. 11 represents relationships between the distance X and a microwave propagation loss. The distance X is defined as a distance from the center of the modulation electrode S on the optical waveguide to the end of the ground electrode G between the optical waveguides in the MZ modulator. Referring to FIG. 11, a solid line (LS-5G) and a dotted line (LS-25G) show the calculated results of propagation loss at the frequency of 5 GHz and 25 GHz, respectively. The propagation loss increases, as the distance X increases, In the range of the distance X from 12.5 μm to 25 μm, the propagation loss (LS-25G) at the frequency of 25 GHz is greater than the propagation loss (LS-5G) at the frequency of 5 GHz. When the distance X is in the range of 12.5 μm to 25 μm, the propagation loss (LS-5G) at the frequency of 5 GHz is about 0.26 dB/mm to 0.35 dB/mm. On the other hand, the propagation loss (LS-25G) at the frequency of 25 GHz is about 1.3 dB/mm to 1.5 dB/mm.

Figure 12:
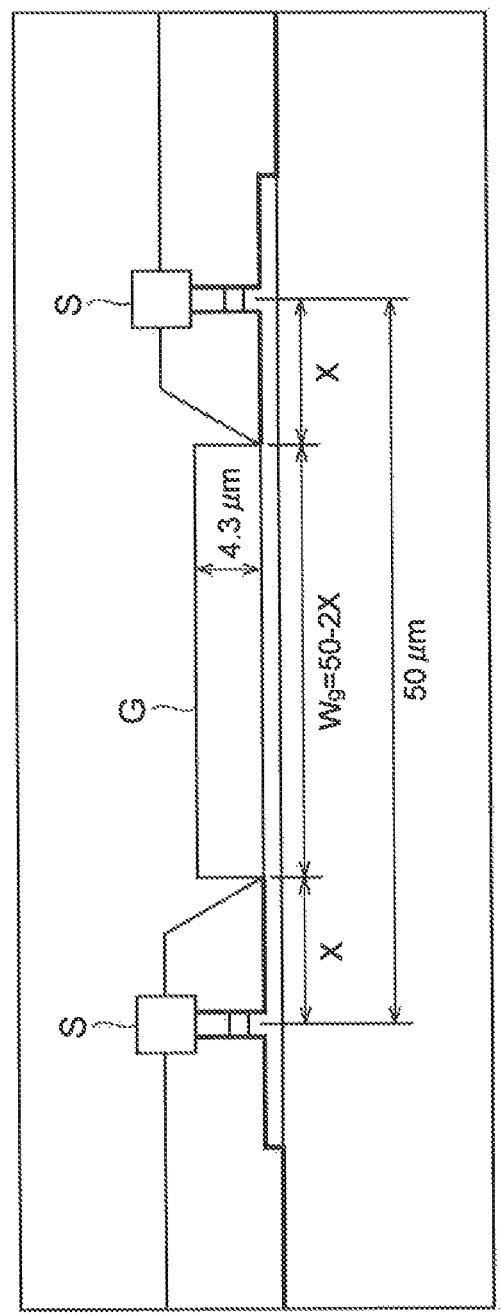
FIG. 12 illustrates a typical structure of the optical waveguide in the MZ modulator which is used for obtaining the graphs of FIGS. 10 and 11.

FIG. 12 illustrates a model used in the simulation to obtain the graphs of FIGS. 10 and 11, and it represents a section corresponding to that illustrated in FIG. 3A. In the illustrated section, a distance between two waveguide arms to which the electrodes S are connected is 50 μm. The distance X from the center of the modulation electrode S to the end of the ground electrode G between the optical waveguides is changed by changing the width of the central ground electrode G. When the distance X is reduced, the differential impedance of the optical waveguide is reduced as illustrated in FIG. 10, and the microwave propagation loss is also reduced.

As one example of the electrical signal transmission line that is matched with the differential impedance of 90Ω at the frequency of 25 GHz and that exhibits a low microwave propagation loss, an electrode (Au) having a width of 45 μm and a thickness of 3 μm is formed on the BCB resin disposed on the surface of a semi-insulating InP substrate. The BCB resin has a low dielectric constant of 2.7. The thickness of the BCB resin on the flat surface of the semi-insulating InP substrate is 5 μm (see the structure of FIG. 3C). The electrical signal transmission line passing over the optical waveguide is capacitively coupled to the p-type semiconductor layers (i.e., the p-type contact layer and the p-type cladding layer) in the optical waveguide. The contact layer of the optical waveguide in a coupling (crossing) region is removed in this example. However, the p-type cladding layer cannot be completely removed because of maintaining the optical confinement of light into the core layer of the optical waveguide. A capacitance in the coupling region causes discontinuity of impedance. Accordingly, reflection of the electrical signal occurs in the coupling region. Therefore, loss of the electrical signal also increases. A thickness of the resin between the optical waveguide and the metallic conductor, which three-dimensionally intersects the optical waveguide, is required to be adjusted in order to reduce an influence of the discontinuity of impedance. That thickness of the resin is preferably 2 μm or more, for example, when the BCB resin is used.

For propagation of the modulation signal, the semiconductor optical modulator employs differential transmission lines including a pair of conductors to propagate the differential signals and a ground conductor sandwiched between the pair of conductors (called an "SGS structure"). A structure different from the SGS structure may also be used, In another specific example of the differential transmission lines, ground conductors may be arranged on both sides of each of paired conductors to propagate the differential signals (called a "GSGSG structure").

The GSGSG structure includes wide ground conductors (G) on both sides of a signal conductor (S). In the GSGSG structure, a metal constituting the GSGSG structure is positioned over the waveguide mesa with the BCB resin interposed therebetween. Stress is introduced into the BCB resin due to the difference in thermal expansion coefficients between the metal and the BCB resin, in addition, the stress is further applied to the waveguide mesa from the metal formed on the BCB resin. The stress applied to the waveguide mesa changes the refractive index of the MQW structure included in the core layer of the optical waveguide. Therefore, propagation characteristics of the optical waveguide is changed due to the stress applied to the waveguide mesa from the metal formed on the BCB resin. Accordingly, the SGS structure is preferably employed in order to reduce a change of the refractive index of the MQW structure in the core layer of the optical waveguide. More specifically, when a multi-mode interference (MMI) coupler is used for optical demultiplexing, characteristics of the optical demultiplexing are largely changed due to the stress because the MMI coupler is sensitive to a change of the refractive index. Thus, the SGS structure is employed to reduce a total area of the three-dimensional intersecting structure of the optical waveguide and the metal passing over the optical waveguide, and to avoid the influence of a change of the refractive index attributable to stress.

As described above, the power consumption depends on not only the differential impedance, but also the voltage amplitude $V\pi$ of the modulation signal. For example, the semiconductor optical modulator having the differential impedance of about 100Ω needs a larger signal amplitude $V\pi$ for driving. Accordingly, to realize lower power consumption, a semiconductor optical modulator having the differential impedance of about 90Ω is more preferable than a semiconductor optical modulator having the differential impedance of about 100Ω.

One example of the structure of a semiconductor modulator having the differential impedance of about 90Ω is as follows. The width of the waveguide arm is preferably in the range of 1.3 μm to 1.5 μm, and it is typically 1.4 μm. The thickness of the i-layer of the waveguide arm is preferably in the range of 0.65 μm to 1.0 μm, and it is typically 0.9 μm. The distance from the center of the electrode on the waveguide arm to the end of the ground electrode is preferably in the range of 12.5 μm to 20 μm, and it is typically 17.5 μm.

When the width of the optical waveguide is reduced to increase the differential impedance, the voltage amplitude $V\pi$ increases. Therefore, reduction of the power consumption is to be studied taking into consideration the voltage amplitude $V\pi$ as well. A related to light scattering due to the surface roughness, dry etching conditions for obtaining a smooth side surface of the waveguide mesa are examined. The range of the waveguide width is preferably set such that the waveguide loss is held at 0.3 dB/mm or less. By reducing a waveguide loss, the modulator has a low optical loss even when the length of a modulation portion is increased. The voltage amplitude $V\pi$ can be decreased by increasing the length of the modulation portion. Therefore, by increasing the length of the optical waveguide for modulation, an increase of the voltage amplitude $V\pi$ for the modulator having an optical waveguide with a narrow width can be avoided. In addition, when the thickness of the i-layer is increased to increase the differential impedance, the voltage amplitude $V\pi$ required for driving is also increased. Accordingly, the power consumption is to be studied taking into consideration such an increase of the voltage amplitude $V\pi$ as well.

A DP-QPSK modulator module incorporating an InP-based modulator and a driver integrated circuit is fabricated and evaluated as follows. The modulator module evaluated here has the same structure as that described above. In more detail, the modulator module includes a DP-QPSK semiconductor modulator, four driver integrated circuits, and a polarization multiplexing optical component. External dimensions of the modulator module are set such that the modulator module is mounted in a small package of 34 mm×16.5 mm. A core layer of each optical modulator includes the multi-quantum well (MQW) structure made of AlGaInAs, and a thickness of the core layer is 0.5 μm. An optical waveguide mesa has a width of 1.5 μm and a height of 3 μm. The optical waveguide is buried in a thick BCB resin body, and an RF supply line is formed on the resin body. Because the RF supply line passes over the semiconductor mesa with the BCB resin body interposed therebetween, the RF supply line and the semiconductor mesa can cross each other through the BCB resin body. An electrode receiving a modulation signal from the outside is connected to a modulation portion through an SGS-type transmission line having a differential characteristic impedance of 90Ω.

Figure 13:
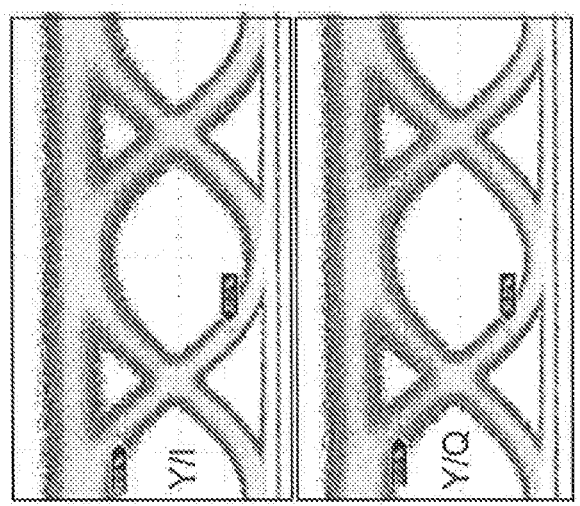
FIG. 13 illustrates an On-Off-Keying (OOK) optical eye pattern measured by inputting, to the optical modulator module, an electrical signal under condition that a non-return to zero (NRZ) signal having an operation voltage amplitude Vπ is applied to a semiconductor optical modulator.
Figure 13:
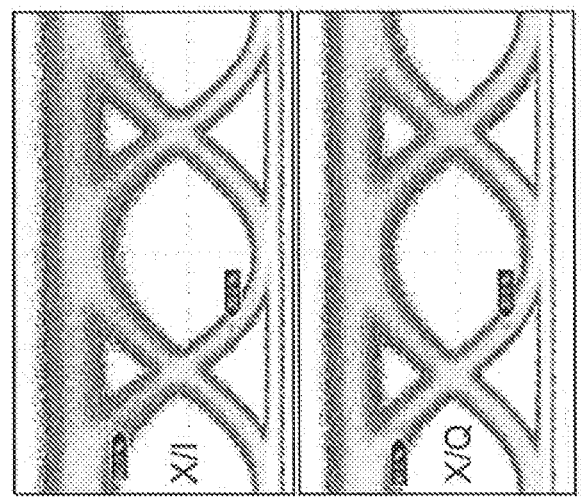

FIG. 13 illustrates an On-Off-Keying (OOK) optical eye pattern. The optical eye pattern is measured by applying a non-return to zero (NRZ) signal to the semiconductor optical modulator. A voltage amplitude of the NRZ signal is set to the voltage amplitude $V\pi$. A semiconductor laser emitting a light having a wavelength of 1564 nm is used as a light source. An output differential voltage amplitude of the driver integrated circuit is set to 1.8 Vpp (each phase: +−0.9 Vpp). As seen from FIG. 13, clear eye openings appear in all phase modulation portions. Moreover, the differential impedance of the semiconductor optical modulator, which is measured with a measuring device using a 4-port network analyzer, is 87Ω. A circuit (electrical circuit) used for the measurement includes the first and second waveguide arms of the MZ modulator, the electrical inputs, and the differential transmission lines in the semiconductor optical modulator.

Figure 14:
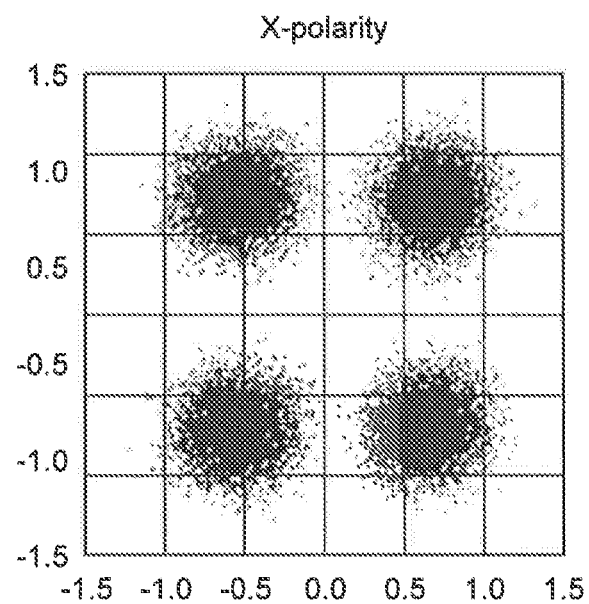
FIG. 14 illustrates a constellation of optical output signals (128 Gb/s, Dual Polarization-Quadrature Phase Shift Keying (DP-QPSK) output signals) of the optical modulator module, which are received by a digital coherent receiver.
Figure 14:
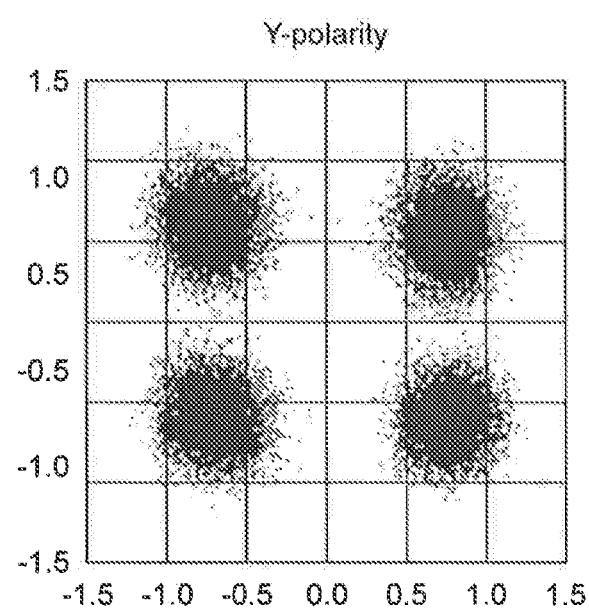

FIG. 14 illustrates an optical output signal (128 Gb/s, DP-QPSK output signal) of the optical modulator module, which is received by a digital coherent receiver. As seen from FIG. 14, a satisfactory constellation is obtained. In this measurement, a semiconductor laser emitting a light having a wavelength of 1550 nm is used as a light source. An output differential voltage amplitude of the driver integrated circuit is 2.5 Vpp that corresponds to 1.4 V$\pi$. Under those driving conditions, a reduction rate of peak optical output intensity is suppressed to 1 dB in comparison with that in general driving at 2V$\pi$. Furthermore, a reduction of about 25% is achieved for the power consumption of the driver integrated circuit. In measurements at −5° C. and +75° C., the power consumption of four driver integrated circuits is 2.4 W, and the power consumption of a thermoelectric cooler (TEC) is 0.8 W.

According to the example described above, in the small modulator module incorporating the InP-based modulator and the driver integrated circuits, the DP-QPSK modulation can be realized with the operation at the differential driving voltage of 2.5 Vpp that corresponds to 1.4 V$\pi$, while the power consumption is held as low as 3.2 W.

It is to be noted that the present invention is not limited to the particular configurations disclosed in the foregoing embodiments.

What is claimed is:

1. A semiconductor optical modulator comprising:
an optical input portion;
an optical output portion;
a plurality of Mach-Zehnder modulators arrayed in a direction of a first axis, each of the Mach-Zehnder modulators including a first waveguide arm with a first modulation electrode and a second waveguide arm with a second modulation electrode;
an optical waveguide having a mesa structure;
an optical demultiplexer coupled between the optical input portion and the Mach-Zehnder modulators through the optical waveguide;
an optical multiplexer coupled between the optical output portion and the Mach-Zehnder modulators;
a plurality of electrical inputs; and
a plurality of differential transmission lines electrically connecting the electrical inputs to the Mach-Zehnder modulators, wherein
the Mach-Zehnder modulators, the optical demultiplexer, the optical multiplexer, the electrical inputs, and the differential transmission lines are disposed on a single substrate, and
the first modulation electrode and the second modulation electrode of at least one Mach-Zehnder modulator, and one of the electrical inputs, and one of the differential transmission lines that connects the said one of the electrical inputs to the at least one Mach-Zehnder modulator form an electrical circuit having a differential impedance in a range of 80Ω 95Ω.

2. The semiconductor optical modulator according to claim 1, further comprising a resin body disposed on the substrate, the resin body embedding the first and second waveguide arms of each Mach-Zehnder modulator, the optical demultiplexer, and the mesa structure of the optical waveguide therein,
wherein each of the Mach-Zehnder modulators further includes a modulator common electrode,
wherein, in each of the Mach-Zehnder modulators;
the first waveguide arm includes a first semiconductor layer having a first conductivity type, a third semiconductor layer having a second conductivity type, and a first core layer disposed between the first semiconductor layer and the third semiconductor layer,
the second waveguide arm includes a second semiconductor layer having a first conductivity type, a fourth semiconductor layer having a second conductivity type, and a second core layer disposed between the semiconductor second layer and the fourth semiconductor layer,
the first modulation electrode is disposed on the first semiconductor layer,
the second modulation electrode is disposed on the second semiconductor layer,
the modulator common electrode is contacted with the third semiconductor layer and the fourth semiconductor layer,
wherein each of the electrical inputs includes a first electrode, a second electrode, and a common electrode disposed between the first electrode and the second electrode, and wherein
each of the differential transmission lines includes a first conductor connecting the first electrode to the first modulation electrode, a second conductor connecting the second electrode to the second modulation electrode, and a third conductor connecting the common electrode to the modulator common electrode,
the third conductor is positioned between the first conductor and the second conductor, and
the first conductor, the second conductor, and the third conductor extend on the resin body in parallel.

3. The semiconductor optical modulator according to claim 2, wherein the resin body contains a benzocyclobutene resin.

4. The semiconductor optical modulator according to claim 2, wherein the first conductor, the second conductor, and the third conductor extend over the mesa structure of the optical waveguide through the resin body, and
the resin body is disposed between the first conductor, the second conductor, and the third conductor and the mesa structure of the optical waveguide.

5. The semiconductor optical modulator according to claim 2, wherein
the modulator common electrode has a width greater than at least a width of one of the first modulation electrode and the second modulation electrode, and
in the differential transmission lines, the third conductor has a width smaller than the widths of the first conductor and the second conductor.

6. The semiconductor optical modulator according to claim 2, further comprising a connecting semiconductor layer having the second conductivity type, the connecting semiconductor layer connecting the third semiconductor layer of the first waveguide arm and the fourth semiconductor layer of the second waveguide arm to each other, wherein
the resin body has a first opening on the first waveguide arm, a second opening on the second waveguide arm, and a third opening on the connecting semiconductor layer,
the first modulation electrode is connected to the first semiconductor layer through the first opening,
the second modulation electrode is connected to the second semiconductor layer through the second opening, and
the modulator common electrode is connected to the connecting semiconductor layer through the third opening disposed between the first waveguide arm and the second waveguide arm.

7. The semiconductor optical modulator according to claim 1, wherein
the substrate has a first edge and a second edge each extending in the direction of the first axis, and a third edge and a fourth edge each extending in a direction of a second axis that intersects the first axis, in the electrical inputs, the first electrode, the second electrode, and the common electrode are arrayed along the first edge, the optical output portion is positioned at the second edge opposite to the first edge, and the optical input portion is positioned at the third edge or the fourth edge.

8. The semiconductor optical modulator according to claim 1, wherein the optical demultiplexer includes a multi-mode interference coupler.

9. An optical modulator module comprising:
a semiconductor optical modulator including a plurality of electrical inputs;
a drive circuit including a differential input having a first impedance and a differential output having a second impedance that is different from the first impedance; and
a relay board including wiring lines that connect the differential output of the drive circuit to the electrical inputs of the semiconductor optical modulator,
wherein the semiconductor optical modulator further includes:
an optical input portion;
an optical output portion;
a plurality of Mach-Zehnder modulators arrayed in a direction of a first axis, each of the Mach-Zehnder modulators including a first waveguide arm with a first modulation electrode and a second waveguide arm with a second modulation electrode;
an optical demultiplexer coupled between the optical input portion and the Mach-Zehnder modulators through an optical waveguide having a mesa structure;
an optical multiplexer coupled between the optical output portion and the Mach-Zehnder modulators; and
a plurality of differential transmission lines electrically connecting the electrical inputs to the Mach-Zehnder modulators, and wherein
the Mach-Zehnder modulators, the optical demultiplexer, the optical multiplexer, the electrical inputs, and the differential transmission lines are disposed on a single substrate, and
the first modulation electrode and the second modulation electrode of at least one Mach-Zehnder modulator, one electrical input, and one differential transmission line that connects the said one electrical input to the at least one Mach-Zehnder modulator form an electrical circuit having a differential impedance in a range of 80Ω to 95Ω.

10. The optical modulator module according to claim 9, wherein the second impedance of the drive circuit is 80Ω or more and 95Ω or less, and
a differential impedance of the wiring lines on the relay board is 80Ω or more and 95Ω or less.

11. The optical modulator module according to claim 9, wherein
the substrate has a first edge and a second edge each extending in the direction of the first axis, and a third edge and a fourth edge each extending in a direction of a second axis that intersects the first axis, the electrical inputs are positioned at the first edge,
the optical input portion is positioned at the third edge or the fourth edge, and
the optical output portion is positioned at the second edge opposite to the first edge.

12. The optical modulator module according to claim 11, wherein
each electrical input includes a first electrode, a second electrode, and a common electrode arrayed along the first edge of the substrate,
the differential input of the drive circuit includes a first ground electrode, a first input electrode, a second input electrode, and a second ground electrode,
the differential outputs of the drive circuit include a first output electrode, a third ground electrode, and a second output electrode that are arrayed in one direction in this mentioned order,
the semiconductor optical modulator further includes a resin body disposed on the substrate, the resin body embedding the first and second waveguide arms of each Mach-Zehnder modulator, the optical demultiplexer, and the mesa structure of the optical waveguide therein,
each of the Mach-Zehnder modulators further includes a modulator common electrode,
the first waveguide arm includes a first semiconductor layer having a first conductivity type, a third semiconductor layer having a second conductivity type, and a first core layer disposed between the first semiconductor layer and the third semiconductor layer,
the second waveguide arm includes a second semiconductor layer having a first conductivity type, a fourth semiconductor layer having a second conductivity type, and a second core layer disposed between the semiconductor second layer and the fourth semiconductor layer,
the first modulation electrode is disposed on the first semiconductor layer,
the second modulation electrode is disposed on the second semiconductor layer,
the modulator common electrode contacts the third semiconductor layer and the fourth semiconductor layer,
each of the differential transmission lines includes a first conductor connecting the first electrode to the first modulation electrode, a second conductor connecting the second electrode to the second modulation electrode, and a third conductor connecting the common electrode to the modulator common electrode,
the third conductor is positioned between the first conductor and the second conductor, and
the first conductor, the second conductor, and the third conductor extend on the resin body in parallel.

13. The optical modulator module according to claim 9, further comprising a polarization multiplexing device that is optically coupled to the optical output portion of the semiconductor optical modulator,
wherein the drive circuit, the relay board, the semiconductor optical modulator, and the polarization multiplexing device are arrayed along a direction of a second axis that intersects the first axis.

* * * * *